US008549306B2

(12) United States Patent
Yoshioka et al.

(10) Patent No.: US 8,549,306 B2
(45) Date of Patent: Oct. 1, 2013

(54) IMAGE MANAGING METHOD AND IMAGE MANAGING SYSTEM

(75) Inventors: Takashi Yoshioka, Kawasaki (JP);
Fumitsugu Matsuo, Shinjuku (JP);
Kiyohide Yamashita, Fukuoka (JP);
Fumiaki Chiba, Kawasaki (JP)

(73) Assignees: Fujitsu Limited, Kawasaki (JP); Fujitsu Advanced Engineering Limited, Tokyo (JP)

( * ) Notice: Subject to any disclaimer, the term of this patent is extended or adjusted under 35 U.S.C. 154(b) by 0 days.

(21) Appl. No.: 13/214,596

(22) Filed: Aug. 22, 2011

(65) Prior Publication Data

US 2011/0302419 A1 Dec. 8, 2011

Related U.S. Application Data

(63) Continuation of application No. PCT/JP2009/053529, filed on Feb. 26, 2009.

(51) Int. Cl.
*H04L 29/06* (2006.01)

(52) U.S. Cl.
USPC ............................................. 713/176; 380/201

(58) Field of Classification Search
None
See application file for complete search history.

(56) References Cited

U.S. PATENT DOCUMENTS

| | | | |
|---|---|---|---|
| 8,095,803 B1 * | 1/2012 | Carter et al. ................... | 713/193 |
| 2007/0050713 A1 | 3/2007 | Yoshioka et al. | |
| 2008/0256362 A1 | 10/2008 | Takenaka et al. | |
| 2009/0193256 A1 * | 7/2009 | Takenaka et al. .............. | 713/176 |

FOREIGN PATENT DOCUMENTS

| | | |
|---|---|---|
| JP | 2008-178048 | 7/2008 |
| WO | 2006/008847 A1 | 1/2006 |

OTHER PUBLICATIONS

International Search Report mailed Oct. 13, 2009 issued in corresponding International Application No. PCT/JP2009/053529.
Takashi Yoshioka et al.; "An Implementation of Partial Integrity Assurance Technology: PIAT for Audio and Video Data (II)", IEICE Technical Report; vol. 108, No. 161; Jul. 2008; pp. 37 to 44 Abstract.
Hidekazu Takahashi et al.; "Kaizan Boshi to Onsei, Doga no Henshu, Ryutsu Ryoritsu saseru"; Jan. 30, 2009; retrieved Oct. 5, 2009 from from itpro.nikkeibp.co.jp/article/Interview/20090127/323572; 2 pp.
Takashi Yoshioka et al., "An Implementation of Partial Integrity Assurance Technology: PIAT for Audio and Video Data"; Thesis No. 1B2-1; 2009 Symposium on Cryptography and Information Security; Oct. 2009; pp. 1-6.

* cited by examiner

*Primary Examiner* — Gilberto Barron, Jr.
*Assistant Examiner* — Malcolm Cribbs
(74) *Attorney, Agent, or Firm* — Staas & Halsey LLP

(57) ABSTRACT

An image managing method includes dividing the original moving image into a header and a body and generating the group hash value of the header portion, generating the hash value of each item of still image data, connecting the group hash value of the header portion and the hash value of each item of still image data to generate connected hash values, generating a group of the connected hash values as a hash value list, generating the hash value of a Huffman table on the basis of cutting out one still image, and signing to generate signature information of the original moving image, using the group hash value of the header portion, the hash value of the Huffman table, and the hash list as verification data of the original moving image, by adding a digital signature of a video recording terminal to it.

18 Claims, 28 Drawing Sheets

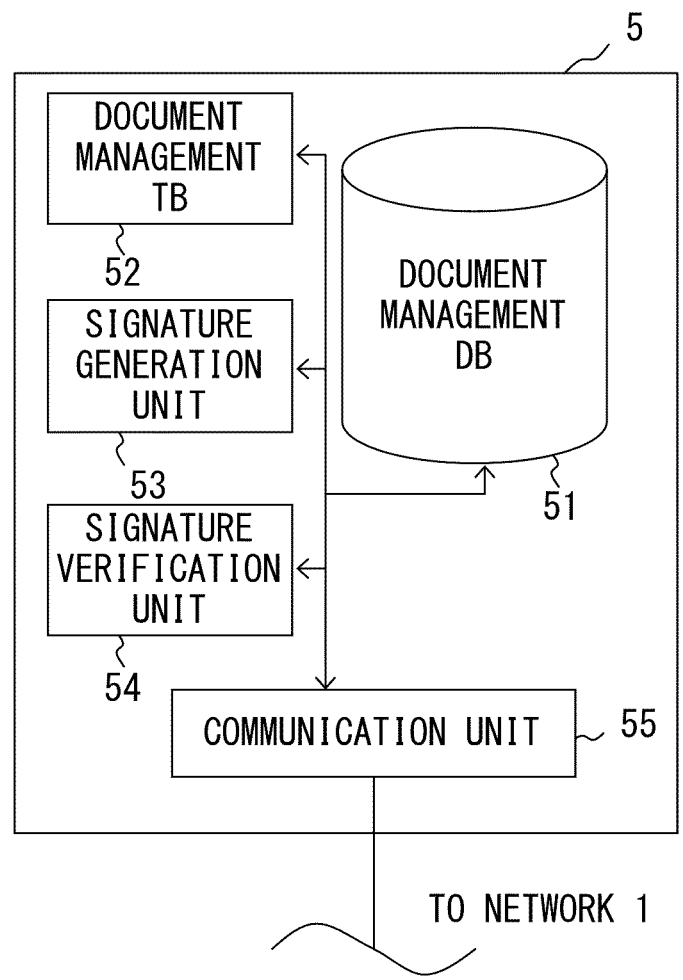
F I G. 4

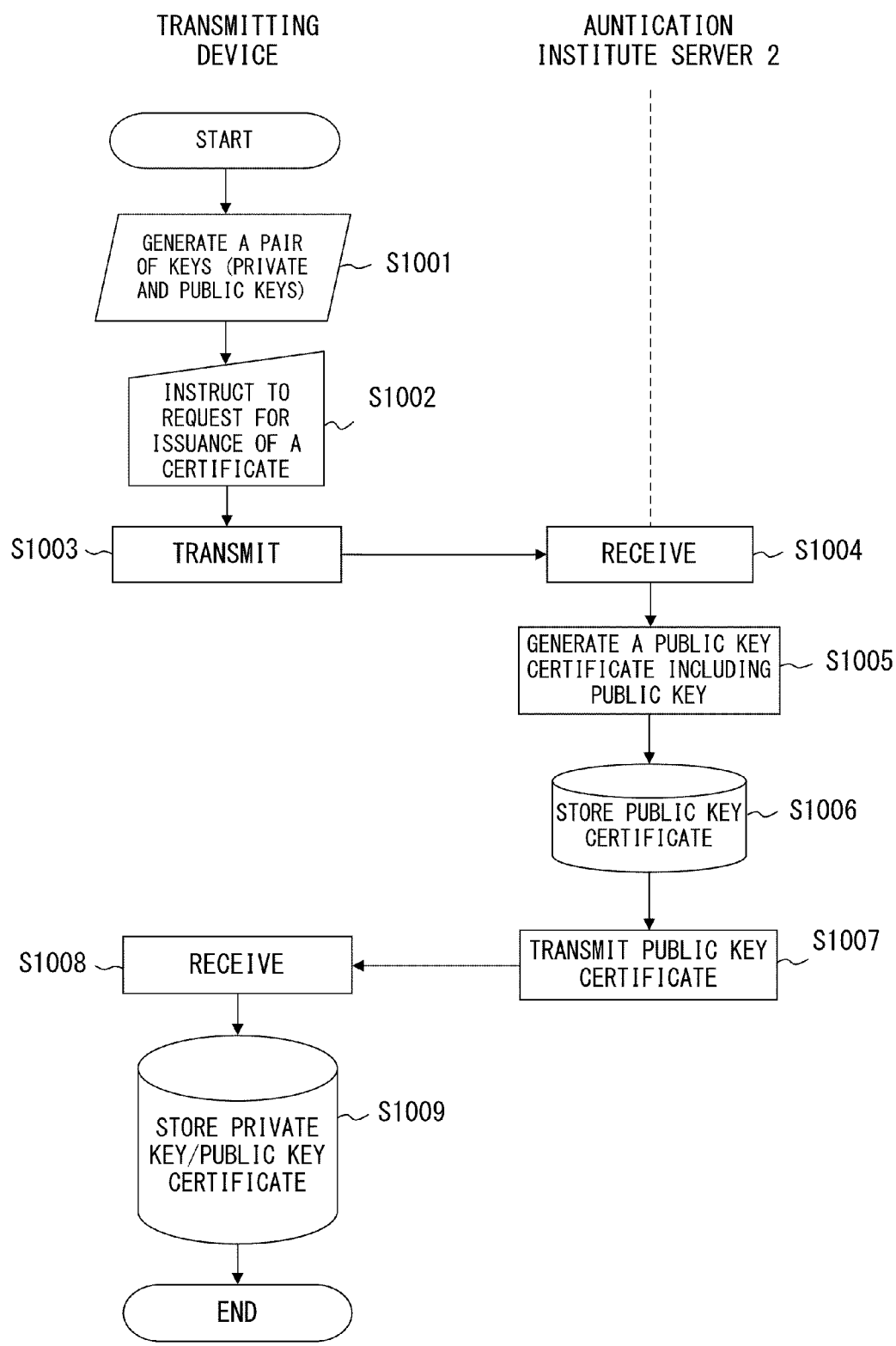
F I G. 6

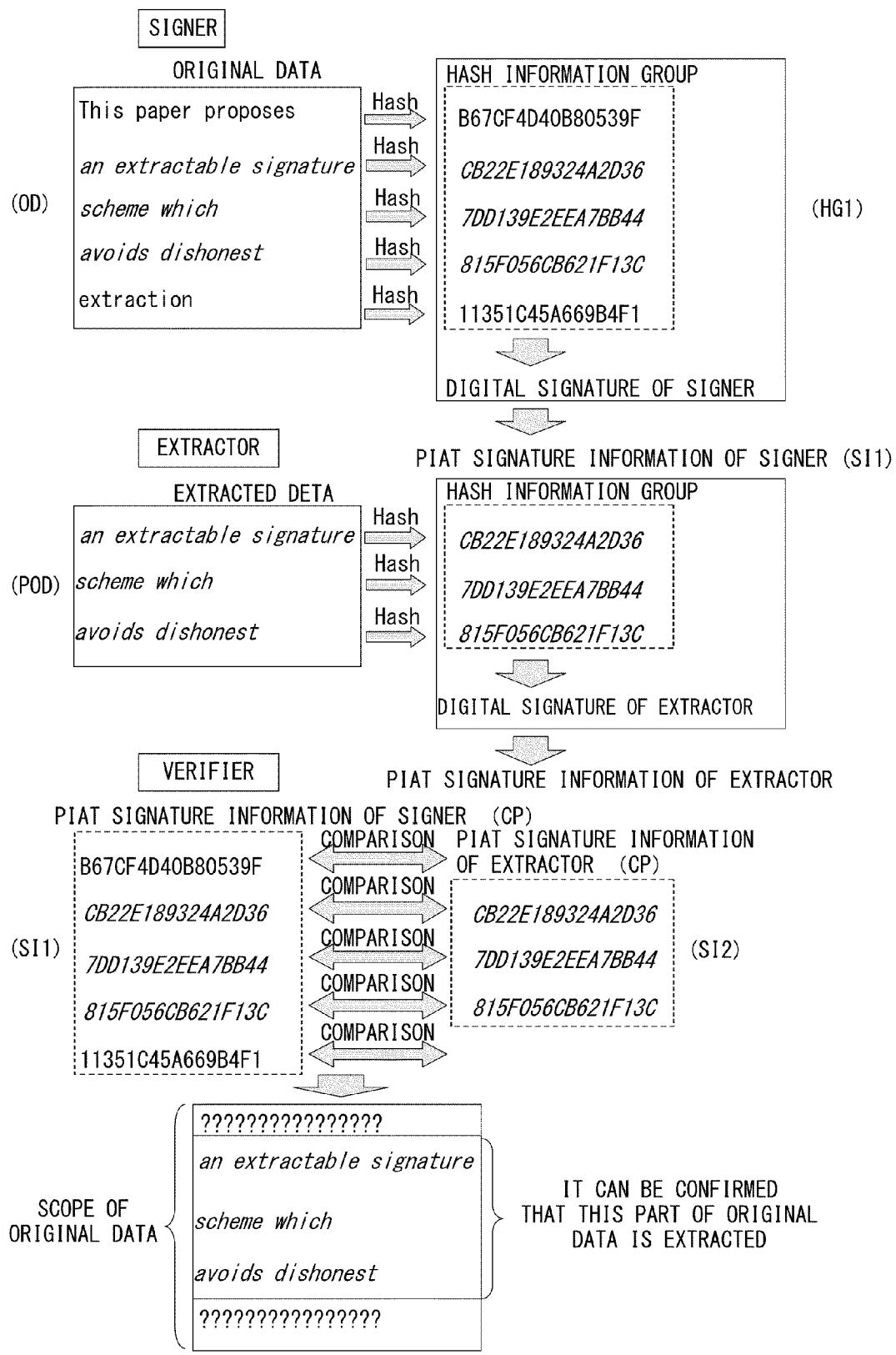
F I G. 8

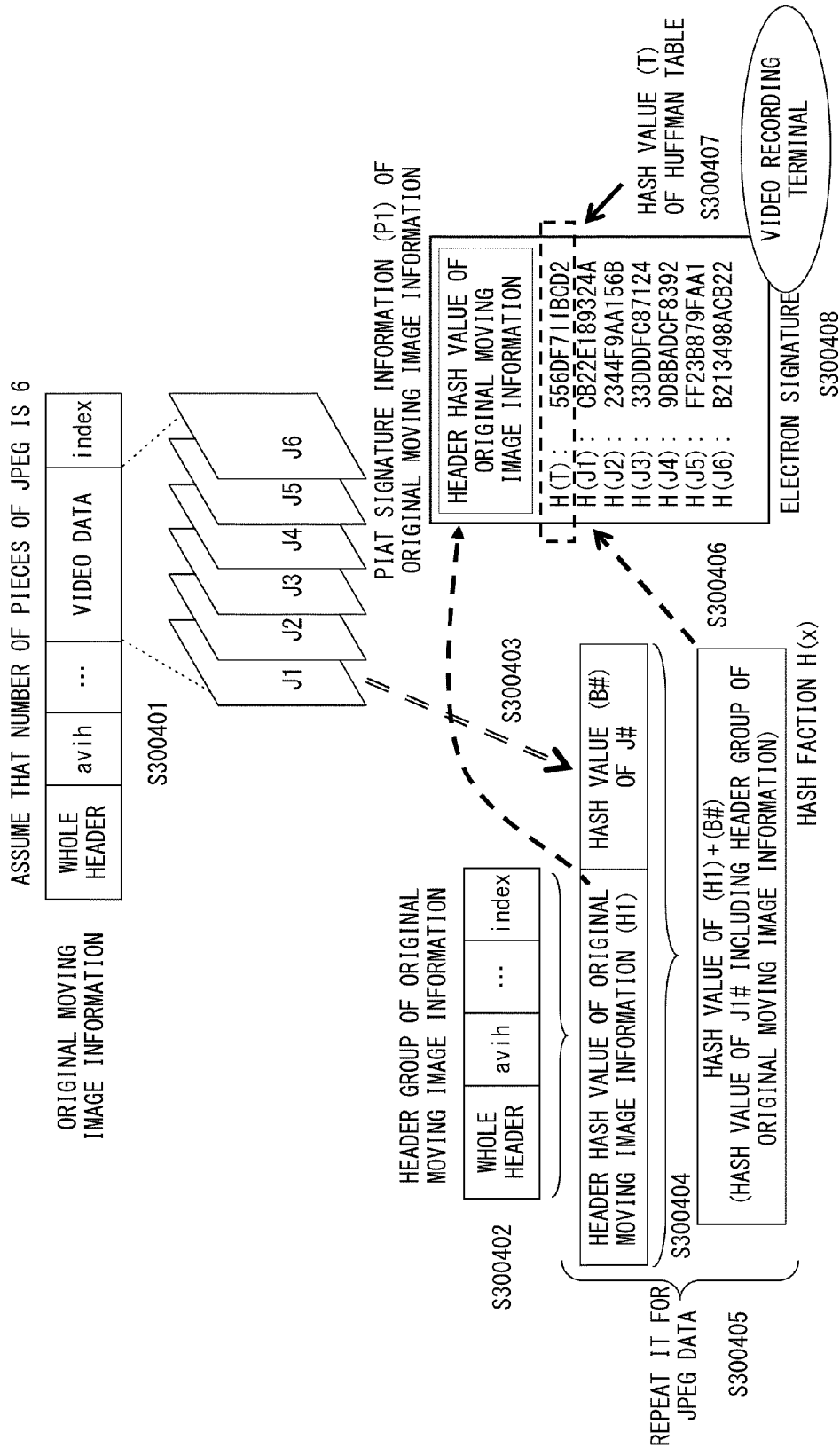
F I G. 12

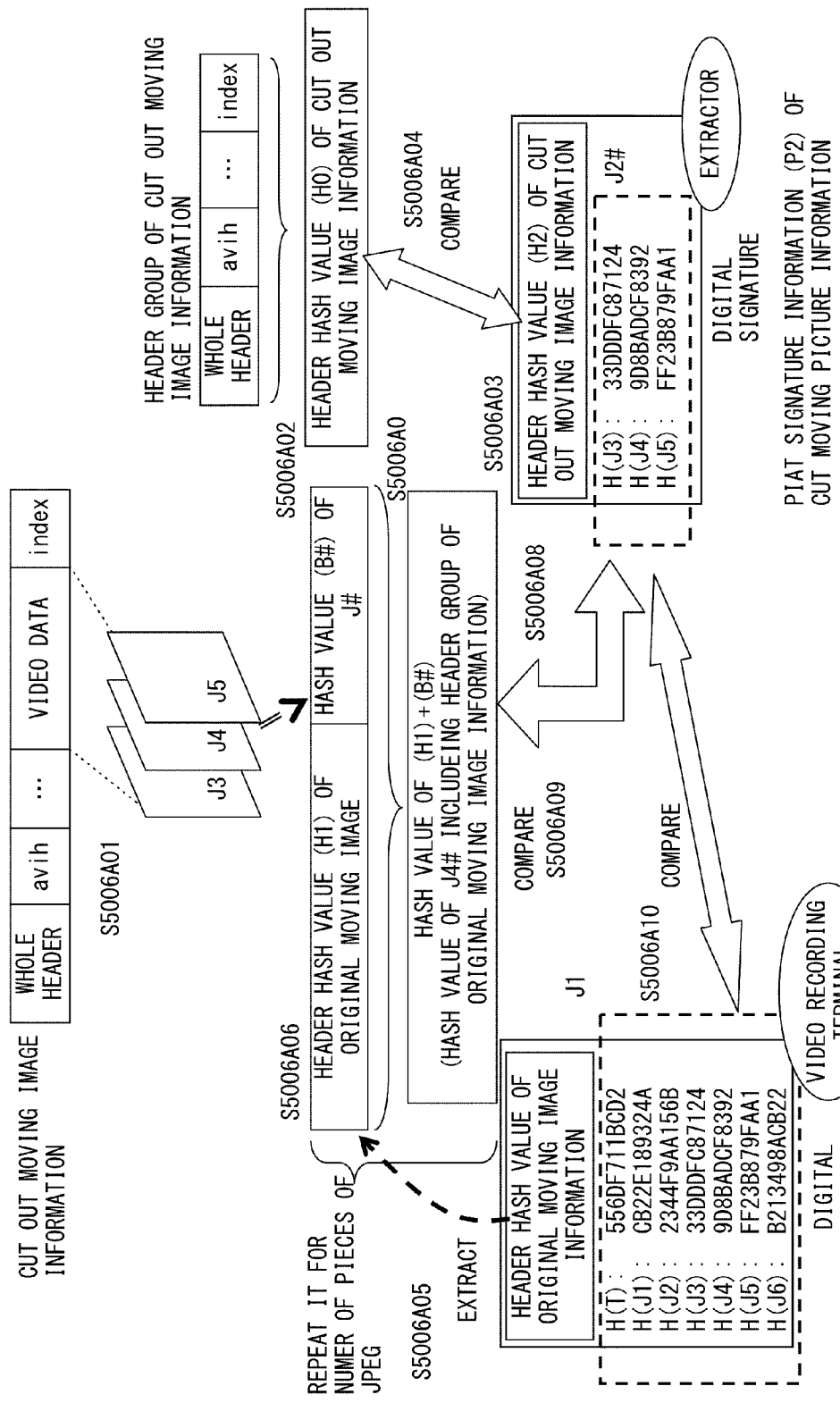
F I G. 22

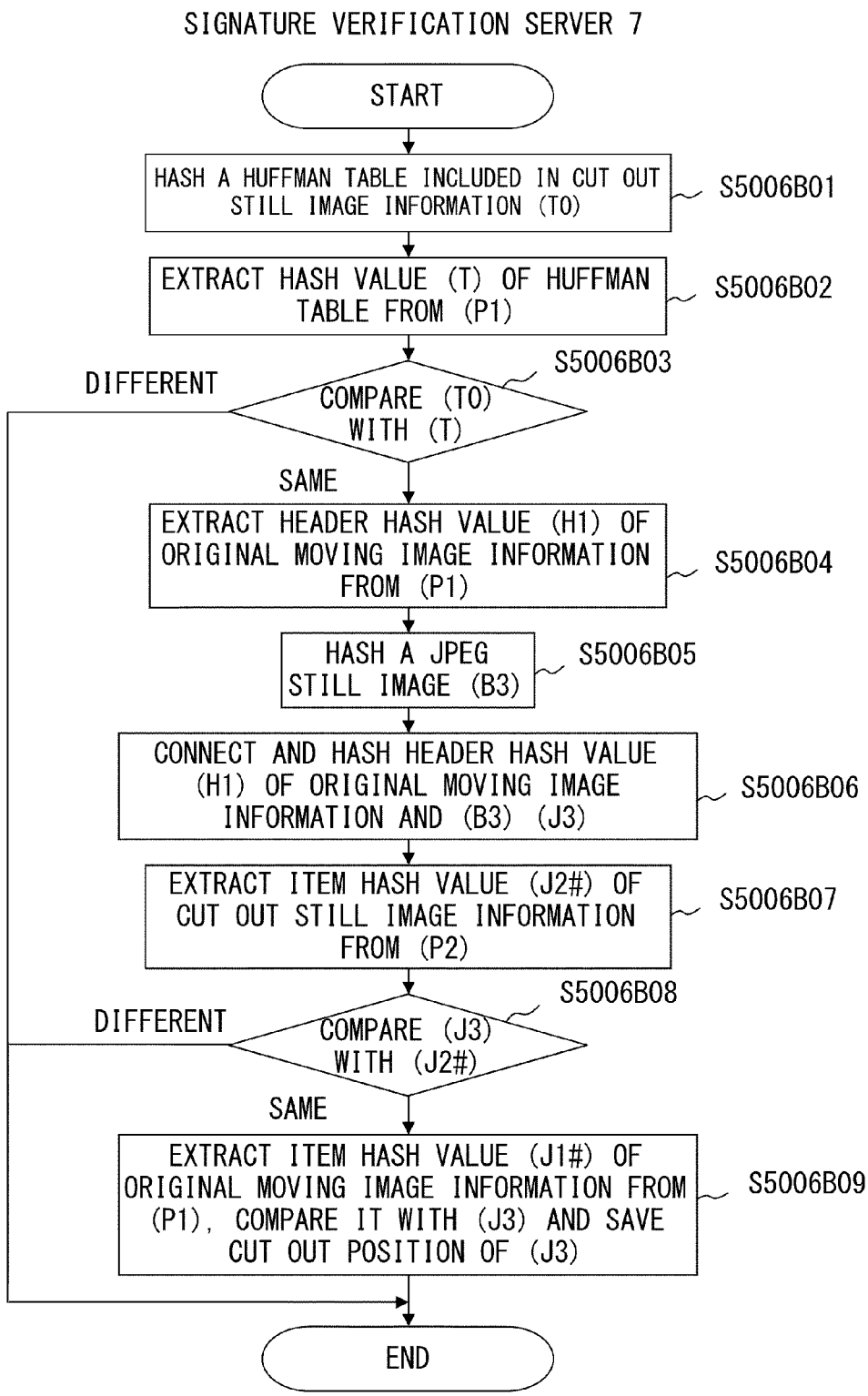
F I G. 2 3

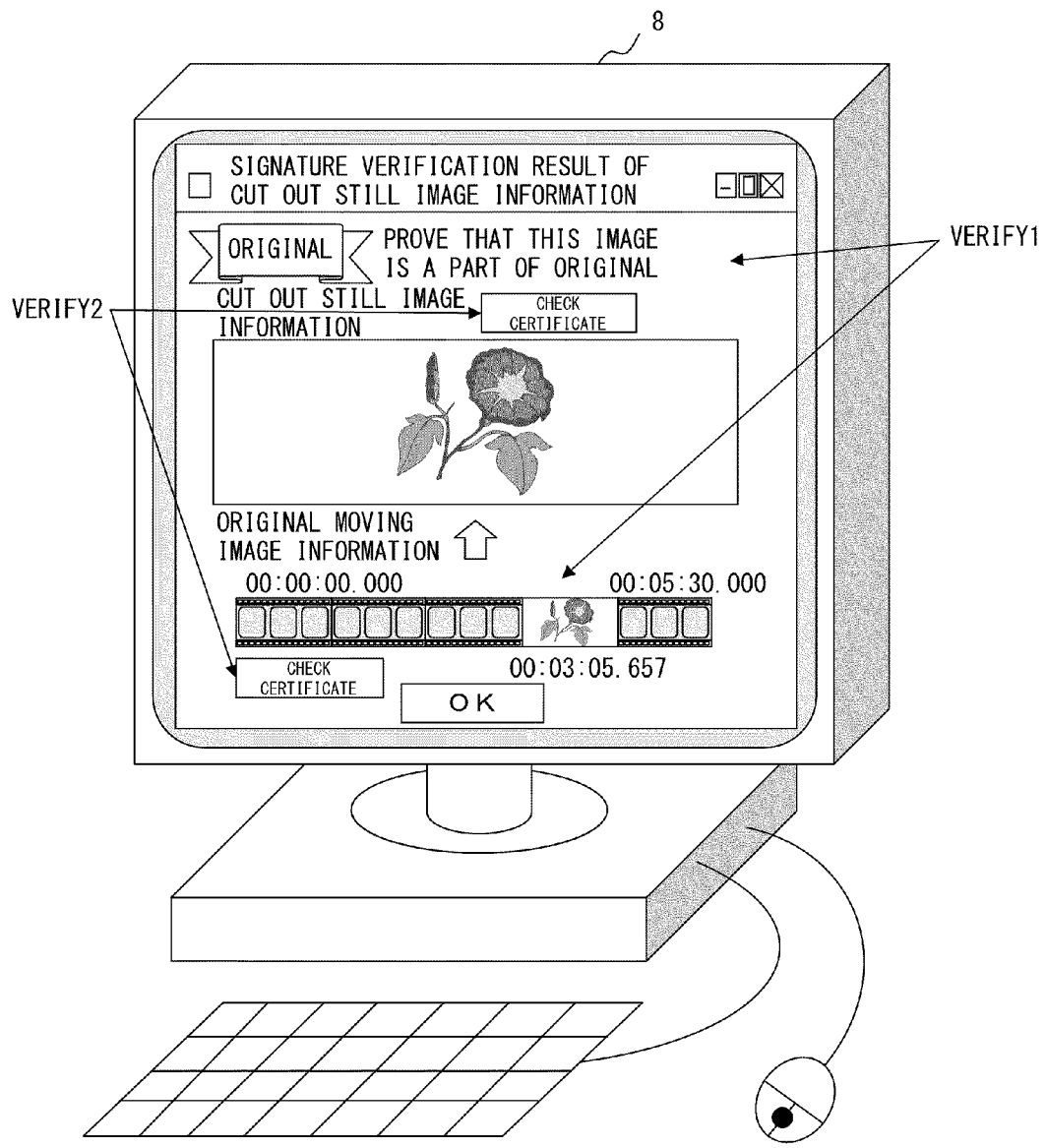
F I G. 2 6

IMAGE MANAGING METHOD AND IMAGE MANAGING SYSTEM

CROSS-REFERENCE TO RELATED APPLICATION

This application is a continuation of PCT application PCT/JP2009/053529, which was filed on Feb. 26, 2009.

FIELD

The embodiments discussed herein are related to the handling of streaming data, such as moving images and audio, and more particularly to the specification of portions extracted from the original data of streaming data which has been partially extracted (more specifically including modified portions, extracted portions, portions sanitized using ink, and the like), and to the security of justification of extracted data and the assurance of partial completeness that can be proven to a third party.

BACKGROUND

Recently the installation of monitoring cameras in stores, downtowns, apartment buildings, etc., and the installation of drive recorders in vehicles for business use and the like have become popular, and cases of using moving images as evidence have been increasing. It has also become a common practice to record communications between customers and telephone operators and to store them as evidence in order to cope with troubles in business agreements and in support businesses conducted over the telephone.

Currently, when moving images and audio recordings are used as evidence, video tapes and image/audio files are provided without being processed. However, if the digitization of image/audio storage progresses, it will become easy to alter or edit these media, and when they are used as evidence, third party verification such as a signatures and a time stamp will become necessary. Indeed, services and products for recording the audio of a telephone operator with a time stamp are already being sold, and it is anticipated that such a technical need will increase.

Furthermore, providing a digital signature is an important technique for assuring the security of electronic data and is applied to agreements, applications, and the like in order to authenticate the producer of the data or to prove that the data has not been not altered. Electronic data to which a digital signature is attached is designed in such a way that the alteration of even one bit can be detected, and is useful in protecting electronic data from unauthorized persons.

However, with the increase in the use of monitoring cameras and the like, the protection of privacy in the use of pictures and video recordings has become a problem; this issue has been discussed in the Ministry of General Affairs and the like. The use of individual private information is also severely restricted by the enforcement of the Individual Privacy Protection Law and the like, and upon request its disclosure, partial deletion, and the like is necessary. In addition, when a long recording of video/audio data is made the amount of data becomes enormous, and when it is presented as evidence, it is necessary to extract the necessary portions.

Thus, since no processing is allowed when a digital signature is applied, it can become an obstacle from the viewpoint of the valid use of electronic data, such as with the partial deletion of data or the extraction of a necessary portion of private information.

In order to cope with two such problems, the need for evidence of electronic data and the need for privacy protection, research into the assurance of the partial originality (completeness) of a portion of an electronic document and a sanitizable signature technology for keeping it secret has been promoted.

More particularly, Patent document 1 below discloses a sanitizable signature technology for an electronic document, for solving the problem of a signature attached to certain document not being able to be verified because a portion of the document is being kept secret (hereinafter abbreviated and explained as PIAT).

By applying this PIAT, a signature can be verified in a state where sanitizing is applied to an electronic document with the signature and it can be proven to a third party that no portion of an original has been altered or added to except for the sanitized portion.

A technology for applying the technology of Patent document 1 to moving image/audio data and realizing the assurance of originality of these pieces of data and the extraction of privacy protectable data from a signature-target is also disclosed in Patent document 2 below.

According to these technologies, even if a portion of moving image/audio data is cut out, it can be proven to a third party that it is a portion of the original and has not been altered.

Furthermore, a media format called Motion-JPEG exists as compressed moving image data. The Motion-JPEG is a compressing/recording method for generating moving image data by using the JPEG (Joint Photographic Experts Group) format, which is a compressing method of a still image; it disposes a compressed JPEG still image in each frame and reproduces it like animation.

Since compression is applied to each frame, the reproduction ratio of Motion-JPEG is high. High-quality recording is possible, an arbitrary point can be quickly accessed, and even a single cut can be made. Recently the camera function of cellular phones compatible with the taking of a still or moving image and the like have adopted Motion-JPEG.

In this Motion-JPEG there are two formats (container formats), AVI (Audio Video Interleave) developed by the Microsoft Corporation and MOV developed by the Apple Corporation.

In particular, the AVI format may be divided into a header (property) and a body (content). The header stores information for reproducing a moving image and audio, such as the number of JPEG still images stored in the body (number of frames), the size of an image, a frame rate, and the like. The body sequentially stores respective pieces of real data of the moving image/audio.

Patent document 1: International Publication Pamphlet No. WO 2006/008847
Patent document 2: Japanese Laid-open Patent Publication No. 2008-178048

SUMMARY

In the above-described conventional technology, the method limits targets to MPEG-1 and MP3 (MPEG-1 Audio Layer-3), which are compressed moving image/audio data. Thus, for example, MPEG-1s are divided into the minimum units of a moving image (called a GOP (Group of Pictures)) which can be obtained by collecting several compressed still images (having a full image and a differential). Therefore, generating/verifying a signature using GOP as one piece of partial information can be considered.

The time of one GOP is approximately 0.5 milliseconds and includes approximately 16 to 18 still images. However, there is no image independence in an individually existing still image unit. Therefore, when one or a plurality of still images in a GOP is cut out as a video picture, the images may not be normally drawn/reproduced, and furthermore it is difficult to prove that they are parts of the original video picture. This happens because an inter-frame prediction technology is used in MPEG-1.

However, targeting AVI Motion-JPEG moving image data that are produced by collecting a plurality of JPEG still images and applying the above-described technology of Patent document 1 can be considered, taking each JPEG still image as one piece of partial information. However, the simple application of this to AVI Motion-JPEG data remains a problem.

Namely, if it is assumed that a plurality of JPEG still images as a video picture or a JPEG still image are cut out from an AVI format video picture, then firstly, when it is cut out as a video picture, rewriting of it to reflect the decreased number of frames arises simultaneously when the cutting out (modifying of the header) happens because the number of JPEG still images (i.e. number of frames) included in the video picture is recorded in the header.

Taking this into consideration, it is considered that a header item having a possibility of being modified is not targeted for a signature, and only a body item (i.e., each JPEG still image) is targeted for having a signature added. However, it cannot be detected if a point that affects its reproduction and drawing, such as the size of an image, a frame rate, and the like recorded in the header, is modified (altered) in a reproducible form.

Secondly, when it is cut out as a still image, a JPEG still image stored in the AVI Motion-JPEG cannot also be normally drawn by cutting it out without processing and outputting it by means of a JPEG viewer.

This happens because JPEG data stored in the AVI Motion-JPEG does not store, between certain areas, data called a Huffman table needed when it is decoded, unlike JPEG data which can be drawn singly.

Therefore, in order to normally draw it by means of the JPEG viewer it becomes necessary to add a Huffman table to the cut out JPEG data and output it. Simultaneously, adding a signature in a state where the Huffman table is added in advance can be considered when the Huffman table is added, taking into consideration adding of the Huffman table and the fact that one JPEG still image is cut out at the time of the signature.

However, when it is cut out as a video picture, it is not necessary to add a Huffman table and even if it is verified using signature data generated in this way, the original cannot be verified as a video picture. As a result, since it becomes necessary to separately store data for signature verification when data for signature verification is cut out as a video picture and when data for signature verification is cut out as a still image, the expansion (duplication) management of signature data will become a problem.

Therefore, the present invention provides a technology capable of cutting out both a video picture and a still image, and also of normally reproducing (drawing) images extracted in each media format and proving to a third party that the video picture and the still image that were extracted are portions of the original and have not been altered.

According to an aspect of the invention, an image managing method for solving the above-described problems manages an original moving image and still images included in the original moving image together as a pair, and includes, in a signature generated for original moving image information, dividing the original moving image into a header and a body and generating the group hash value (H1) of the header portion, generating the hash value (B#) of each piece of still image data, connecting the hash value (H1) of the header portion and the hash value (B#) of each piece of still image data to generate each connected hash value (J1#), generating a group of connected hash values (J1#) as a hash value list (L1), generating the hash value (T) of a Huffman table on the basis of cutting out one still image, and signing to generate signature information of the original moving image, using the group hash value (H1) of the header portion, the hash value (T) of the Huffman table, and the hash value list (L1) as verification data of the original moving image, by adding a digital signature of a video recording terminal to it.

According to an aspect of the invention, a non-transitory storage medium to store an image managing program causes a computer to manage an original moving image and still images included in the original moving image together as a pair, and includes, in the case of generating a signature of original moving image information, dividing the original moving image into a header and a body and generating a group hash value (H1) of a header portion, generating a hash value (B#) of each piece of still image data, connecting the group hash value (H1) of the header portion and the hash value (B#) of each piece of still image data to generate each connected hash value (J1#), generating a group of connected hash values (J1#) as a hash value list (L1), generating a hash value (T) of a Huffman table on the basis of cutting out one still image, and signing to generate signature information of the original moving image, using the hash value (H1) of the group header portion, the hash value (T) of the Huffman table, and the hash value list (L1) as verification data for the original moving image, by adding a digital signature of a video recording terminal to it.

According to an aspect of the invention, a non-transitory storage medium to store an image managing program also causes a computer to manage an original moving image and still images included in the original moving image together as a pair, and includes, in the case of generating cut out moving image information from a received original moving image and storing it, specifying a still image of a portion cut out in the original moving image, generating a cut out moving image and modifying the number of frames in such away that header items can be reproduced, extracting a group hash value (H1) of a header portion included in the signature from signature information of the received original moving image, dividing the cut out moving image into a header and a body and generating an item group hash value (H2) of a header portion, generating a hash value (B#) of each piece of still image data of the cut out moving image, connecting the group hash value (H1) of the header portion extracted from signature information of the received original moving image and the hash value (B#) of each piece of still image data of the cut out moving image to generate a hash value (J2#) of each piece of still image data, specifying a group of the connected hash values (J2#) as a hash value list (L2), and signing to generate signature information of the cut out moving image, using the hash value (H2) of the header group and the hash value list (L2) as verification data for the cut out moving image, by adding a digital signature of an extractor to it.

According to an aspect of the invention, a non-transitory storage medium to store an image managing program for causing a computer to manage an original moving image and a still image included in the original moving image also includes, in the case of generating cut out still image information from the received original moving image and storing it, specifying a still image of a portion to be cut out, generating a cut out still image, and attaching a Huffman table to its proper place in such a way that it can be drawn, extracting a hash value (H1) of a header portion included in the signature from signature information of the received original moving image, generating a hash value (B3) of cut out still image data, connecting the hash value (H1) of the header portion extracted from the signature information of the original moving image and the hash value (B3) of the cut out still image data to generate a connected hash value (J3) of each piece of still image data, and signing to generate signature information of the cut out still image, using the connected hash value (J3) generated by the generating the connected hash value as verification data for the cut out still image, and adding a digital signature of an extractor to it.

According to an aspect of the invention, a non-transitory storage medium to store an image managing program for causing a computer to manage an original moving image and a still image included in the original moving image together as a pair, also includes, in the case of verifying cut out moving image information, receiving a cut out moving image, signature information of the cut out moving image, and signature information of the original moving image, dividing the cut out moving image into a header and a body, generating an item group hash value (H0) of a header portion, and comparing it with a hash value (H2) included in the signature information of the cut out moving image and determining whether they are the same, extracting a header group hash value (H1) included in the signature information of the original moving image, generating a hash value (B#) of each piece of still image data of the cut out moving image, connecting the header group hash value (H1) extracted from the signature information of the original moving image and each generated hash value (B#) to generate a connected hash value (J4#) of each piece of still image data, comparing the connected hash value (J2#) of a hash value list (L2) included in the signature information of the cut out moving image with the generated connected hash value (J4#) and determining whether they are the same, and comparing the connected hash value (J1#) in the hash value list (L1) included in the signature information of the original moving image with the connected hash value (J2#) of the hash value list (L2) included in the signature information of the cut out moving image and determining whether their cut points are the same.

According to an aspect of the invention, a non-transitory storage medium to store an image managing program for causing a computer to manage an original moving image and a still image included in the original moving image together as a pair, also includes, in the case of verifying cut out still image information, obtaining the cut out still image, signature information of the cut out still image, and signature information of the original moving image, generating a hash value (T0) of a Huffman table included in the cut out still image, comparing it with a hash value (T) of the Huffman table included in the signature information of the original moving image, and determining whether they are the same, extracting a group hash value (H1) of a header portion included in the signature information of the original moving image, generating a hash value (B3) of each piece of still image data of the cut out still image, connecting the header group hash value (H1) extracted from the signature information of the original moving image and the hash value (B3) of each piece of the generated still image data to generate a connected hash value (J3), comparing the connected hash value (J3) generated by the generating the connected hash value with the hash value (J3) of still image data included in signature information of the cut out still image and determining whether they are the same, and comparing a connected hash value (J1#) of a hash value list (L1) included in the signature information of the original moving image with the connected hash value (J3) included in the signature information of the cut out still image and verifying a cut point.

According to an aspect of the invention, an image managing device for managing an original moving image and a still image included in the original moving image together as a pair, also includes, in the case of generating a signature of original moving image information, a first group hash value generation unit to divide the original moving image into a header and a body and generating a group hash value (H1) of a header portion, a first still image data hash value generation unit to generate a hash value (B#) of each piece of still image data, a first connected hash value generation unit to connect the group hash value (H1) of the header portion and the hash value (B#) of each piece of still image data to generate each connected hash value (J1#), a first list generation unit to generate a group of connected hash values (J1#) as a hash value list (L1), a Huffman table generation unit to generate a hash value (T) of a Huffman table on the basis of cutting out one still image, and a first signing unit to generate signature information of the original moving image, using the group hash value (H1) of the header portion, the hash value (T) of the Huffman table, and the hash value list (L1) as verification data for the original moving image, and adding a digital signature of a video recording terminal to it.

BRIEF DESCRIPTION OF DRAWINGS

FIG. 4 is a configuration of an information extraction server 5 in accordance with an embodiment.

FIG. 6 is a flowchart illustrating the registration process of a public key between the transmitting device and the authentication institute server 2 in accordance with an embodiment.

FIG. 8 illustrates a summary of the algorithm for PIAT.

FIG. 12 illustrates the PIAT signature information generation of the original moving image information performed by the system in accordance with an embodiment.

FIG. 22 illustrates the PIAT signature information verification process of cut out moving image information performed by the system in accordance with an embodiment.

FIG. 23 is a flowchart illustrating the PIAT signature information verification process of cut out still image information performed by the system in accordance with an embodiment.

FIG. 26 illustrates the signature verification result of cut out still image information performed by the system in accordance with an embodiment.

DESCRIPTION OF EMBODIMENTS

Preferred embodiments of this video picture data managing device will be explained in detail below with reference to accompanying drawings.

Figure 1:
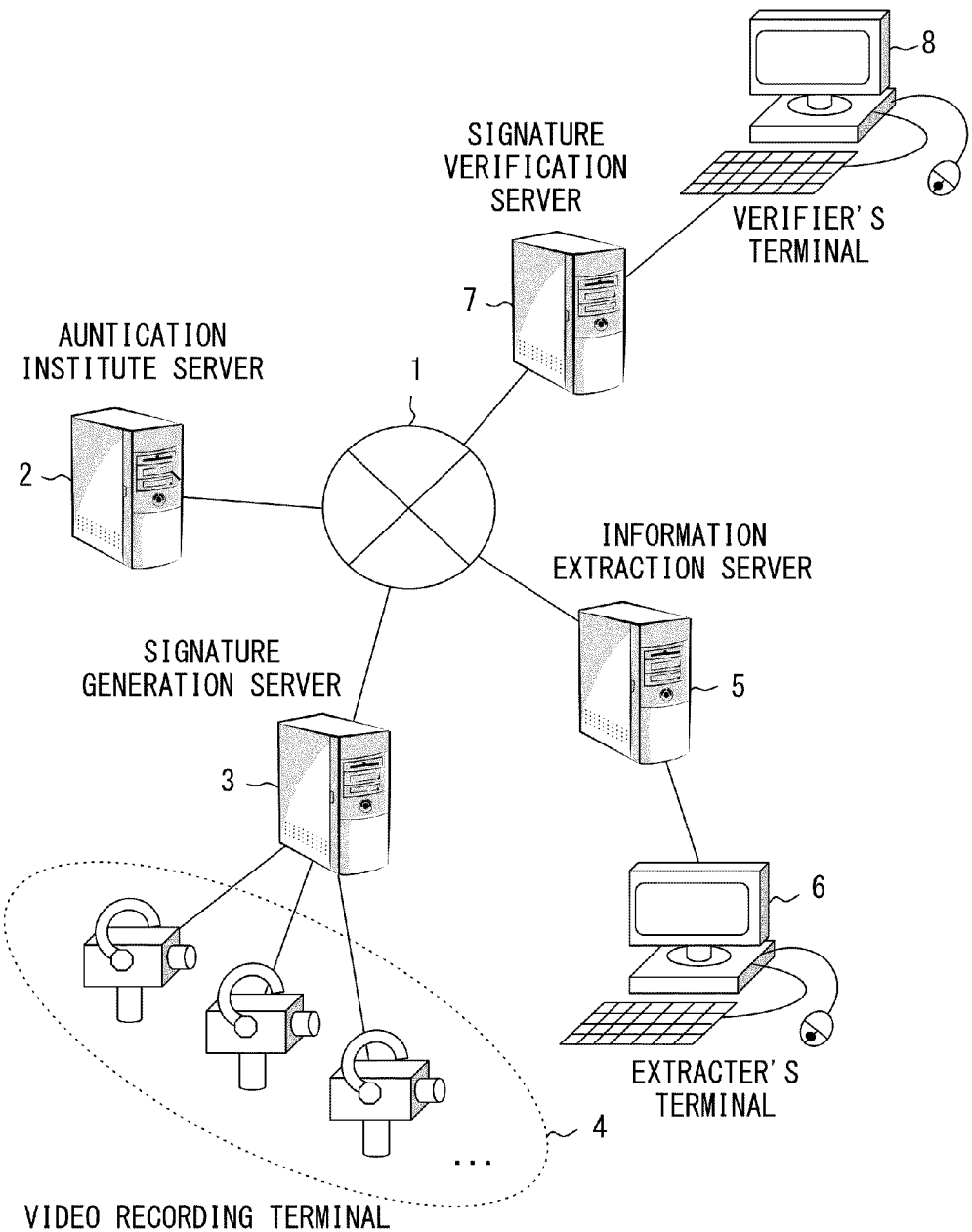
FIG. 1 is a configuration of an information extraction proving system in accordance with an embodiment.

Firstly, the system configuration of the video recording extraction proving system of the video data managing device in accordance with an embodiment will be explained with reference to FIG. 1. FIG. 1 is the configuration of the system in accordance with an embodiment.

In FIG. 1, reference No. 1 is a network. However, the network can correspond to any type of communication network, including the Internet, an intranet, a wide area network, and the like. Reference No. 2 is an authentication institute server for managing digital signature information.

As is publicly known, in a digital signature, a transmitter transmits signature-target information, a public key certificate, and signature information which is obtained by encoding, using the private key of a transmitter, information obtained by summarizing (message-digesting) signature-target information, to an opposite party. After checking the validity of the public key certificate, a receiver decodes the encoded signature information using a public key included in the public key certificate and compares the decoded signature information with summarized information obtained from the signature-target information. A digital signature is a technology for determining whether it has been transmitted from an authorized party by judging whether or not this comparison yields the result that the two are the same, which will be explained in detail later.

Since in this digital signature technology, it is necessary to ensure the validity of the certificate, as in the embodiment, an authentication institute server 2 storing the public keys of a video recording terminal and of extractors are generally installed.

Figure 2:
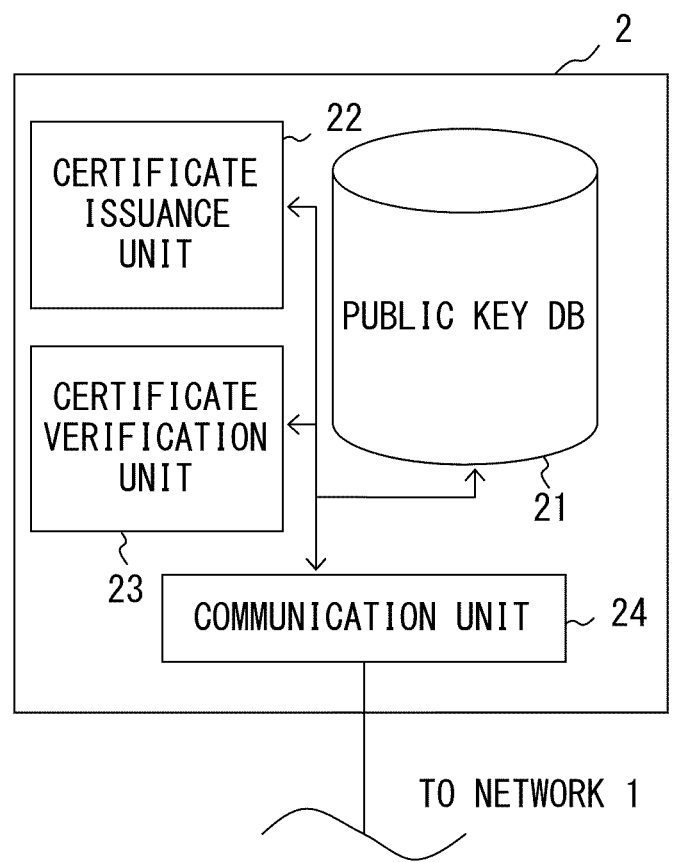
FIG. 2 is a configuration of an authentication institute server 2 in accordance with an embodiment.

As illustrated in FIG. 2, this authentication institute server 2 includes a public key DB 21 for storing the public keys of the video recording terminal and of extractors, a certificate issuance unit 22 for issuing a public key certificate as requested, a certificate verification unit 23 for verifying public key certificates, and a communication unit 24 for conducting communications via the network 1.

Figure 3:
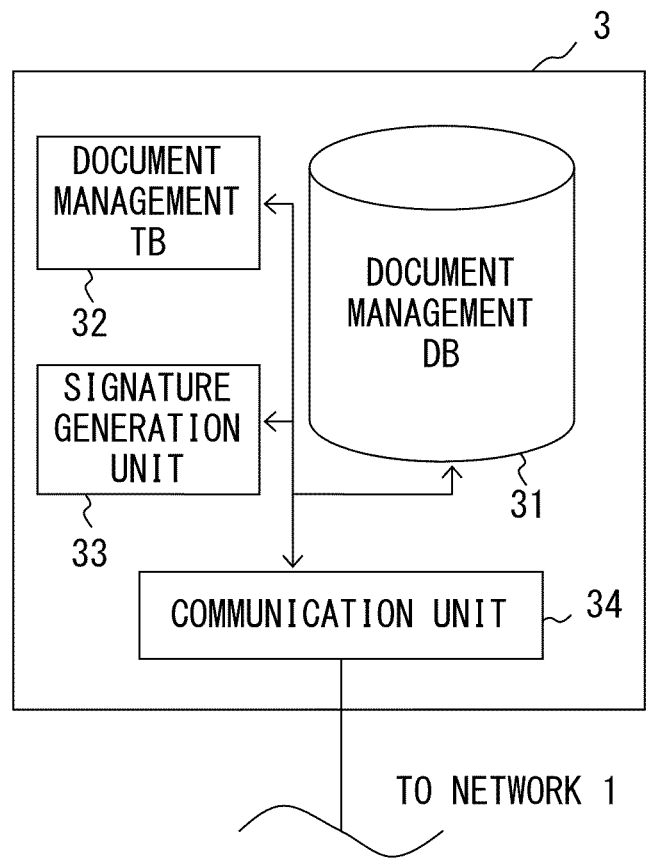
FIG. 3 is a configuration of the signature generation server 3 in accordance with an embodiment.

Reference No. 3 is a signature generation server for storing information transmitted from a video recording terminal 4, which will be explained later, and performing a signing process. As illustrated in FIG. 3, this signature generation server 3 includes a document management DB (database) 31 for storing information transmitted from the later-described video recording terminal 4 and information transmitted to an information extraction server 5 which will be explained later, a document management TB (table) 32 for controlling access to the document management DB 31, a signature generation unit 33 for adding PIAT signature information and a digital signature to the information from the later-described video recording terminal 4, and a communication unit 34 for conducting communications via the network 1.

Reference No. 4 is a video recording terminal which takes/records target information, that is, original streaming data (hereinafter called original moving image information). For example, the video recording terminal 4 may correspond to a business monitoring camera or the like. This video recording terminal 4 can communicate with the signature generation server 3.

Reference No. 5 is an information extraction server. As illustrated in FIG. 4, this information extraction server 5 includes a document management DB 51 for storing information transmitted from the signature generation server 3 and information transmitted to a signature verification server 7, which will be explained later, a document management TB 52 for controlling access to the document management DB 51, a signature generation unit 53 for adding the PIAT signature information of an extractor and a digital signature to information, a signature verification unit 54 for verifying the digital signature attached to transmitted information, and a communication unit 55 for conducting communications via a network.

Reference No. 6 is a terminal used for an extraction to operate the information extraction server 5. This extractor's terminal 6 can communicate with the information extraction server 5.

Figure 5:
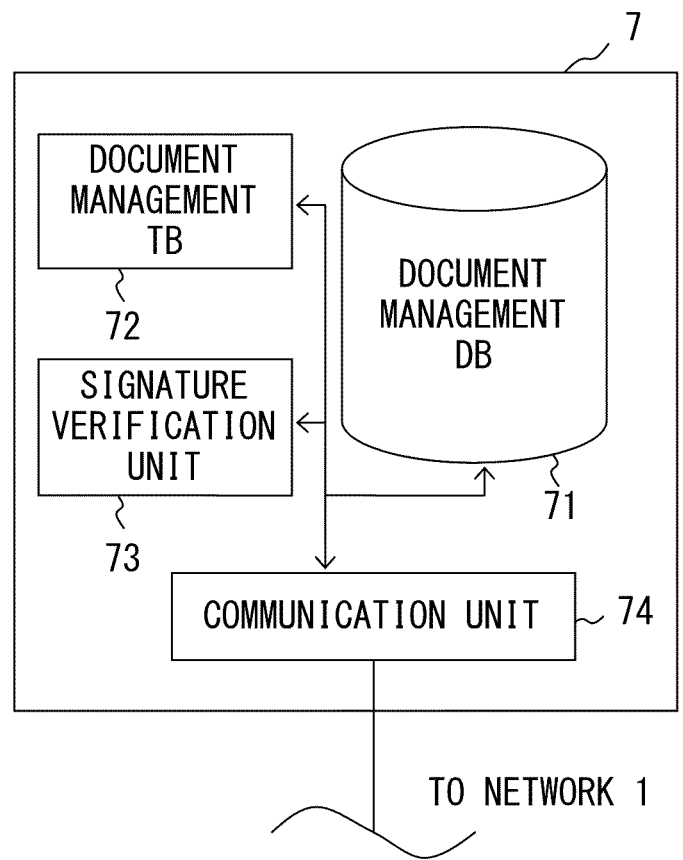
FIG. 5 is a configuration of a signature verification server 7 in accordance with an embodiment.

Reference No. 7 is a signature verification server. As illustrated in FIG. 5, this signature verification server 7 includes a document management DB 71 for storing information transmitted from the information extraction server 5, a document management TB 72 for controlling access to the document management DB 71, a signature verification unit 73 for verifying a digital signature attached to the transmitted information and PIAT signature information, and a communication unit 74 for conducting communications via a network.

Reference No. 8 is a terminal used for a verifier to operate the signature verification server 7. This verifier's terminal 8 can communicate with the signature verification server 7.

The processing operation of the system configured above will be explained below. Firstly, the digital signature process of the device in the embodiment is explained.

In a digital signature, a transmitter generates a pair of keys (a private key and a public key) in advance, transmits the public key to the authentication institute server 2 in order to issue a public key certificate, and stores this private key and the public key certificate in a transmitting device. When transmitting information from the transmitting device, the transmitter first generates the summarized information (message digest) of signature-target information and generates signature information by encoding the summarized information using the private key of the transmitter.

Then, the transmitter transmits the signature-target information, the signature information, and the public key certificate of the transmitter to an opposite party. Upon receipt of these, the opposite party (receiver) verifies the validity of the obtained public key certificate of the transmitter against the authentication institute server 2. If it is valid, the receiver decodes the signature information by this public key.

Then, the receiver generates the summary of the signature-target information and compares it with the decoded information. If they are the same, it can be proven that it has been properly transmitted from the transmitter and has not been altered.

Summarized information in this case is information calculated by applying a cryptological one-directional hash function to the signature-target information (hash information), and is also called message digest for the reason that the size of the signature-target information can be compressed. Hash information generated using the cryptological one-directional hash function can be generated only from the signature-target information and the original information cannot be reproduced from the generated hash information.

Therefore, hash information is often used to encode information or to generate a digital signature. This cryptological one-directional hash function has a plurality of algorithms, such as MD5, SHA-1 and SHA-256. Information (hash information generation algorithm) about which algorithm is applied to information in order to generate summarized information (hash information) is described in the public key certificate.

The detailed procedure of digital signature generation is explained below.

Firstly, the registration of a public key between the transmitting device and the authentication institute server 2 is explained with reference to the flowchart illustrated in FIG. 6. In the example illustrated in FIG. 1, the transmitting devices of a digital signature are the signature generation server 3 and the information extraction server 5.

Firstly, a transmitter generates a pair of keys (private and public keys) (S1001). Then, when the transmitter operates a transmitting device to input certificate issue request information (S1002), the transmitting device transmits the inputted certificate issue request information to the authentication institute server 2 together with the public key (S1003).

Upon receipt of this piece of information by the communication unit 24 of the authentication institute server 2 (S1004), the certificate issuance unit 22 of the authentication institute server 2 generates a public key certificate including a public key (S1005) and stores the generated public key certificate in the public key DB 21 (S1006).

Then, the certificate issuance unit 22 controls the communication unit 24 to transmit the issued public key certificate to the transmitting device that has transmitted the certificate issue request information, via the network 1 (S1007).

Upon receipt of this piece of information (S1008), the transmitting device stores the private key generated in S1001 and the public key certificate issued by the authentication institute server 2 in a storage device (the storage area in the signature generation unit 33 of the signature generation server 3 and the storage area in the signature generation unit 53 of the information extraction server 5), representatively (S1009), and completes the process.

Figure 7:
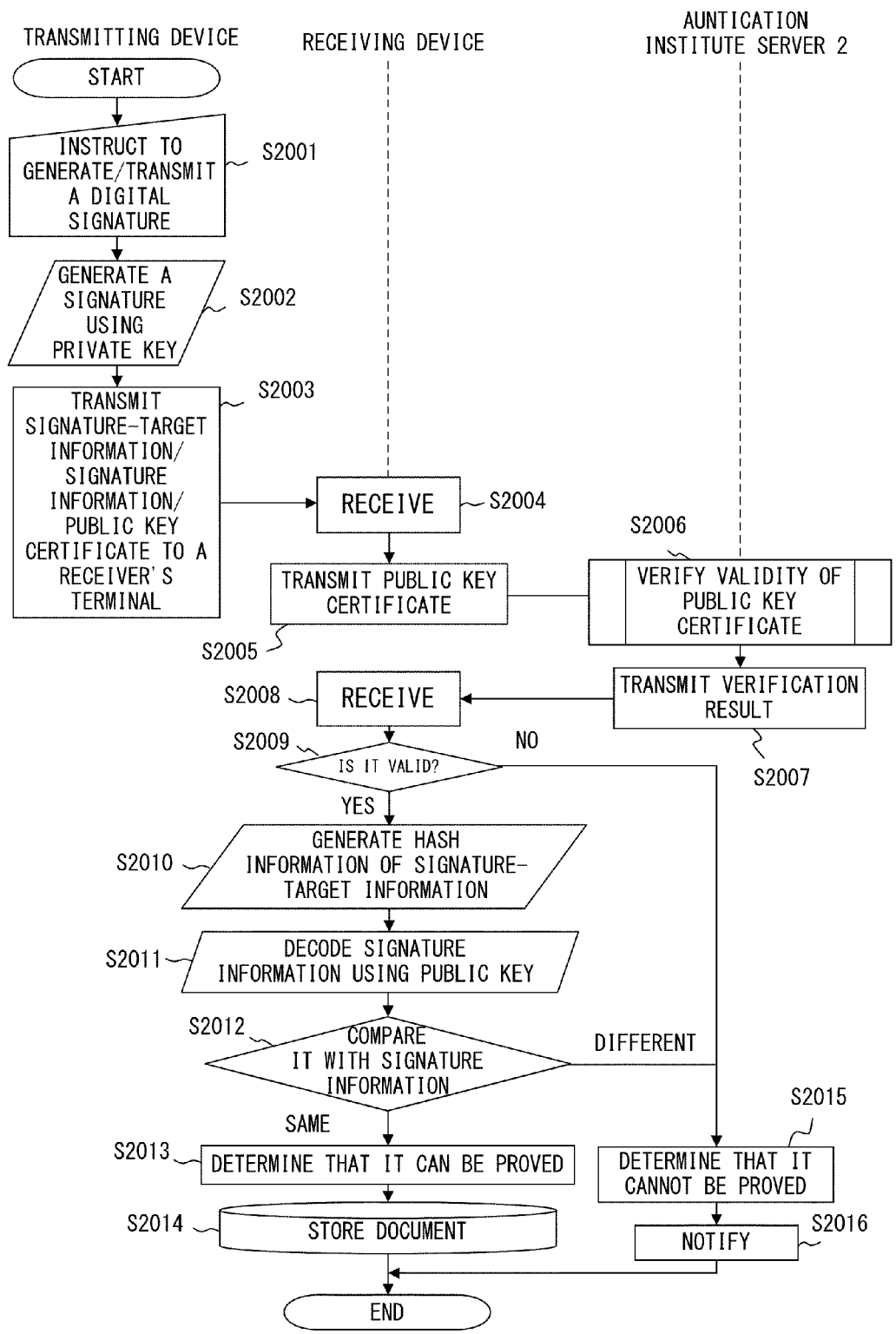
FIG. 7 is a flowchart illustrating the transmitting/receiving process of information with a digital signature and the verification process of the receiving device in accordance with an embodiment.

Next, the transmitting/receiving process of information with a digital signature and the verification process of a receiving device in the embodiment is explained with reference to the flowchart illustrated in FIG. 7.

Firstly, when the transmitter generates a digital signature for certain signature-target information and inputs a transmit instruction for a receiving device (S2001), the transmitting device encodes the summarized information (hash information) of signature-target information specified by the transmitter by using the private key stored in the storage area (S2002) and transmits it to the receiving device together with the public key certificate stored in the same way (S2003).

Upon receipt of this piece of information (S2004), the receiving device firstly transmits the public key certificate to the authentication institute server 2 in order to check the validity period, invalidation information, and the like of the transmitted public key certificate (S2005).

In this example it is assumed that the authentication institute server 2 supports a series of functions to issue and verify a certificate. Then, the authentication institute server 2 verifies the validity of the received public key certificate (S2006) and transmits the verification result to the receiving device (S2007).

Then, the receiving device receives this validity verification result (S2008). Then, upon receipt of this validity verification result, the receiving device checks whether or not the verification result is valid (S2009). If it is confirmed that it is valid, the receiving device firstly refers to a hash information generation algorithm included in the public key certificate of the transmitter, obtained from the transmitting device, and generates hash information from the signature-target information received from the transmitting device (S2010).

Then, the signature information received from the transmitting device is decoded using the public key included in the public key certificate (S2011). The receiving device compares the hash information generated in S2010 with the information obtained by the decoding process in S2011, and determines whether they are the same (S2012). If it is confirmed in this determination that they are the same, those pieces of information are stored (S2014) since it has been proven that the information has been transmitted from the transmitting device (transmitter) and has not been altered (S2013).

Conversely, if they are different, it is determined that it has not been proven that the information has been transmitted from the transmitting device (transmitter) (or it is determined that it has been altered during communications, etc.) (S2015) and a notification process, such as displaying that it cannot be proven or the like, is performed for the operator of the receiving device (S2016).

When the validity of the public key certificate is not confirmed in the process of S2009, it is also determined that it has not been proven that the information has been transmitted from the transmitting device (transmitter) (S2015) and a notification process, such as displaying that it cannot be proven or the like, is performed for the operator of the receiving device (S2016).

Before the process according to the embodiment is explained, a summary of algorithm for PIAT is illustrated in FIG. 8.

A signer divides signature-target data (OD) into a plurality of pieces of partial data, and calculates the hash information of each piece of partial data to generate a hash information group (HG1). Then, the digital signature of the signer is attached to the generated hash information group to generate PIAT signature information (SI1) by combining the hash information group with the digital signature.

An extractor extracts partial data from the data to which the signer has attached the PIAT signature information (POD). In this case, the partial data that is not extracted is erased. Then, the extractor performs the same operation as that of the signer to generate the PIAT signature information (SI2) of the extractor.

A verifier firstly verifies the completeness of hash information on the basis of the PIAT signature information of both the signer and the extractor (SI1, SI2). Then, the verifier generates a hash information group from the disclosed partial data and verifies whether it coincides with the hash information group included in the PIAT signature information of the extractor.

Lastly, it is found that the same portion of two pieces of the hash information is a position extracted from the original data by comparing (CP) the hash information groups of both the signer and the extractor. If the hash information of the extraction data is not included in the hash information of the PIAT signature information of the signer, it is found that the partial data has been altered.

Then, streaming information that is targeted in the embodiment is explained and necessary definitions are made. MPEG-1/2/4 is a representative moving image format and MP3, WAV, AVI and the like are audio formats. In the embodiment, explanations are given with AVI as the target.

AVI is moving image data of AVI Motion-JPEG generated by collecting a plurality of JPEG still images, and the camera function and the like of a cellular phone compatible with the taking of still and moving images adopts Motion-JPEG.

Figure 9:
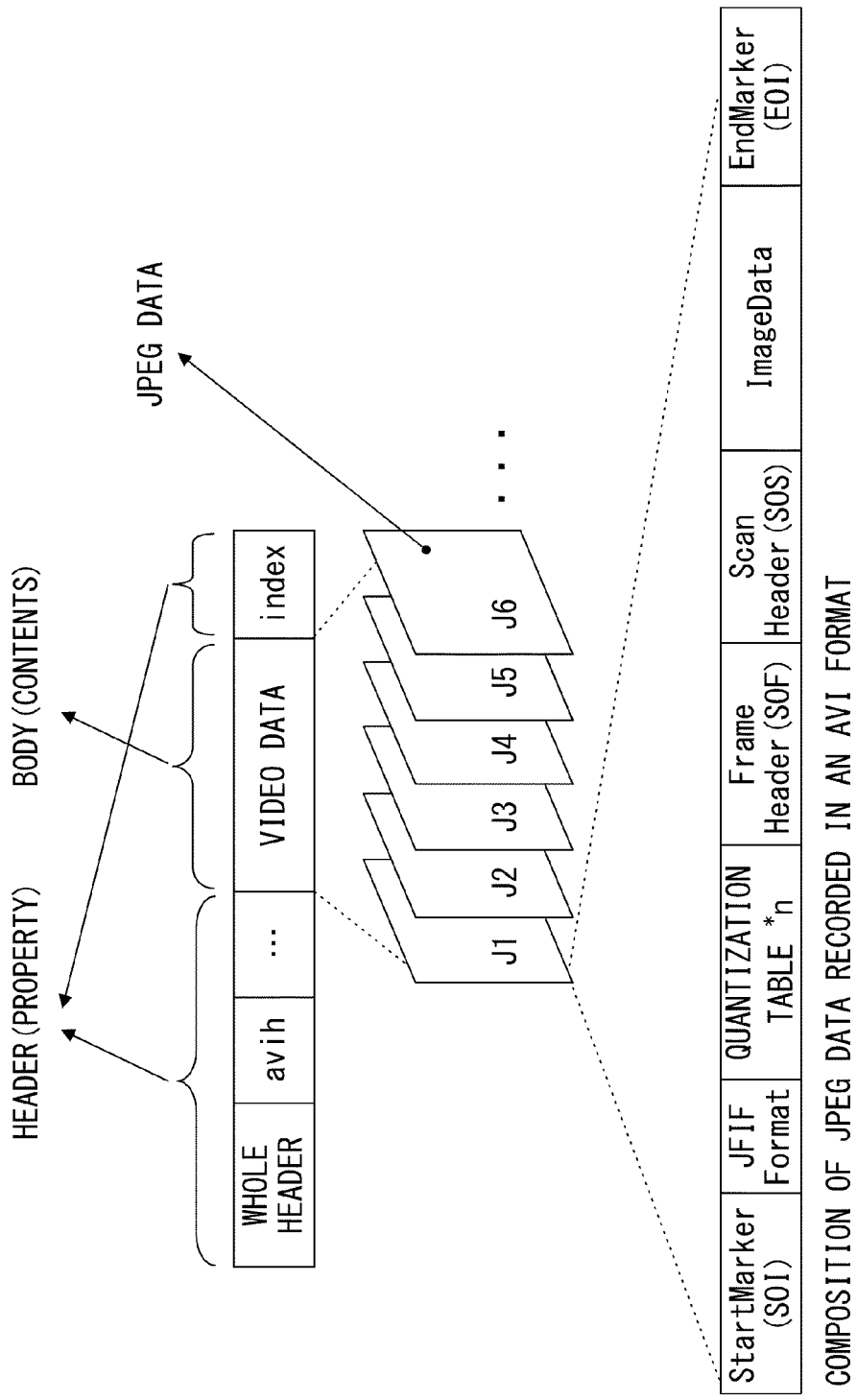
FIG. 9 is a composition of an AVI format.

FIG. 9 illustrates the composition of an AVI format. The AVI format can be divided into a header (property) and a body (content). The header stores information for reproducing moving images and audio, such as the number of JPEG still images (number of frames) stored in the body, the size of an image, a frame rate, and the like.

The body sequentially stores respective pieces of real data of a moving image and audio. JPEG data recorded on the AVI format stores information from StartMarker (SOI) to End-Marker (EOI).

Next, the application of PIAT to the AVI format according to the embodiment will be explained.

Before explaining the flow of its process in detail, prior conditions in the embodiment are defined in advance. Firstly, a system where the video recording terminal 4 for recording original moving image information adds a signature is considered. The video recording terminal 4, such as a monitoring camera, corresponds to a business camera or the like.

In the embodiment, there are three operators of the video recording terminal 4 (a manager, an extractor, and a verifier). Namely, there is a manager which issues video record start and stop instructions to the video recording terminal 4 by pressing record start and stop buttons, respectively, mounted on the video recording terminal 4, an extractor which cuts out one portion of target original moving image information to generate cut out moving image information, and a verifier which verifies disclosed cut out moving image information.

The video recording terminal 4 provides the following conditions for the extractor and the verifier. The video recording terminal 4 ensures the content of signature-target original moving information via a signature. It is necessary to perform a signature under conditions such that which portion of the target moving image information is extracted is unknown.

The extractor partially extracts data from the original moving image information signed by the video recording terminal 4 and discloses it to the verifier as cut out information. There are two kinds of extracting methods, named extraction where the information of the extractor is disclosed and it is clarified who has extracted it, and anonymous extraction where the extractor anonymously extracts it.

In the embodiment, explanations are given on the assumption that named extraction is used. The verifier verifies whether the disclosed cut out information is ensured by the video recording terminal 4. It is verified that in addition to the fact that the disclosed cut out information is part of the original moving image information signed by the video recording terminal 4, the extraction was made by the extractor. It is assumed that, regarding a process of the digital signature, the above-described digital signature procedure is performed by respective devices.

Figure 10:
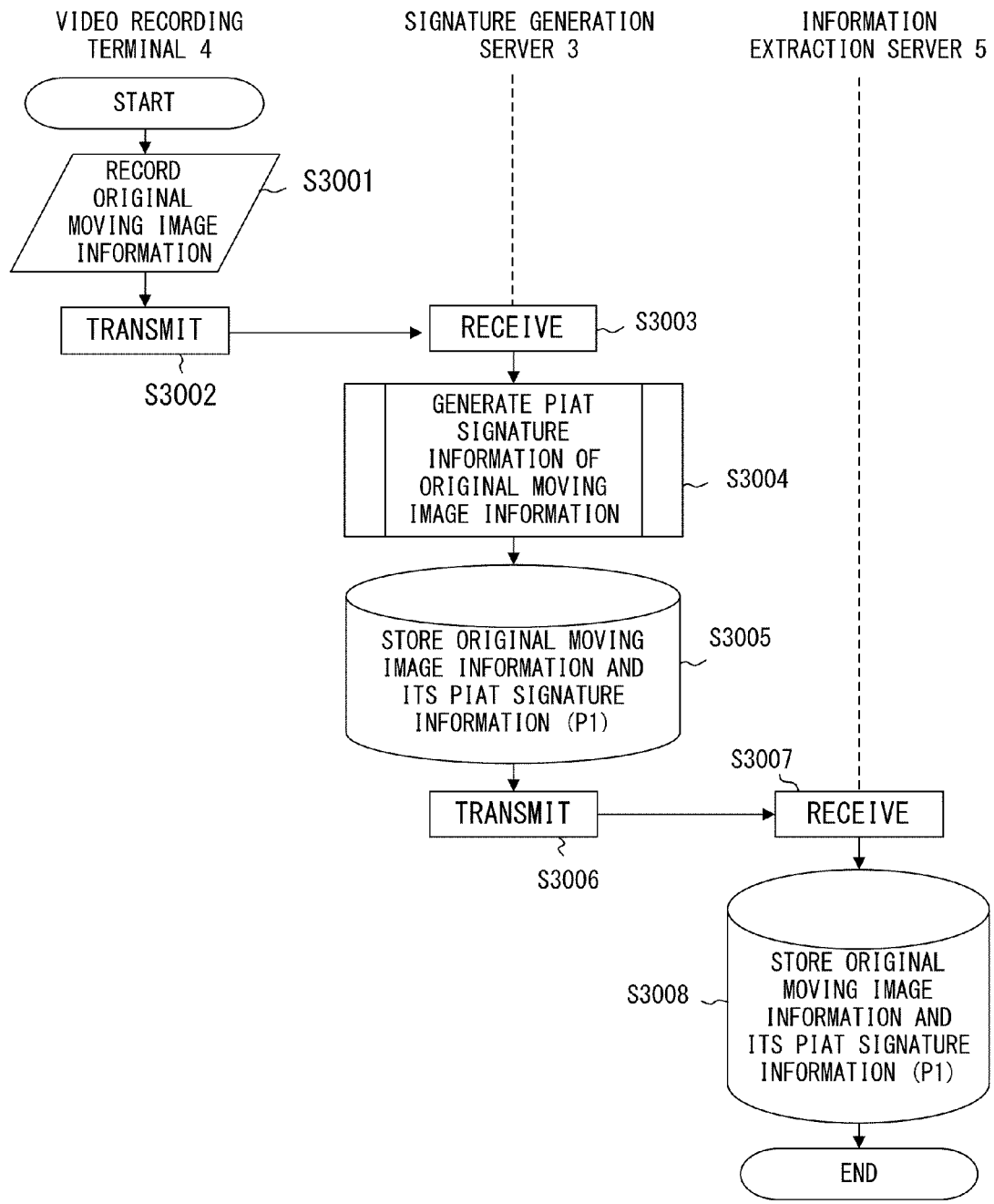
FIG. 10 is a flowchart illustrating the generation process of original moving image information and the signature generation process performed by the system in accordance with an embodiment.

FIG. 10 is a flowchart illustrating the generation process of original moving image information and the signature generation process.

The video recording terminal 4 starts recording signature-target original moving image information (3001). This start instruction is conducted by the manager of the video recording terminal 4. For example, it can be executed by pressing a record start button mounted on the video recording terminal 4. It is assumed that pictures during recording are to be stored in the storage area of the video recording terminal 4. A record stop instruction is performed by the manager. For example, it is executed by pressing a record stop button mounted on the video recording terminal 4.

After generating of the original moving image information is completed, the generated original moving image information is transmitted to the signature generation server 3 (S3002). Upon receipt of the original moving image information (S3003), the signature generation server 3 firstly divides the original moving image information into a plurality of pieces of partial information. This dividing of the original moving image information into a plurality of pieces of partial information is preformed in such a way that AVI data can be extracted. Since the AVI data is a collection of a plurality of JPEG still images, the original moving image information is divided as the plurality of pieces of partial information such that each of a plurality of JPEG still images is treated as the partial information.

The algorithm for PIAT is applied taking the above into consideration. Since it is an object to extract moving image data, in the embodiment it is assumed that of all pieces of data, the continuous moving images in one place are cut out.

Figure 11:
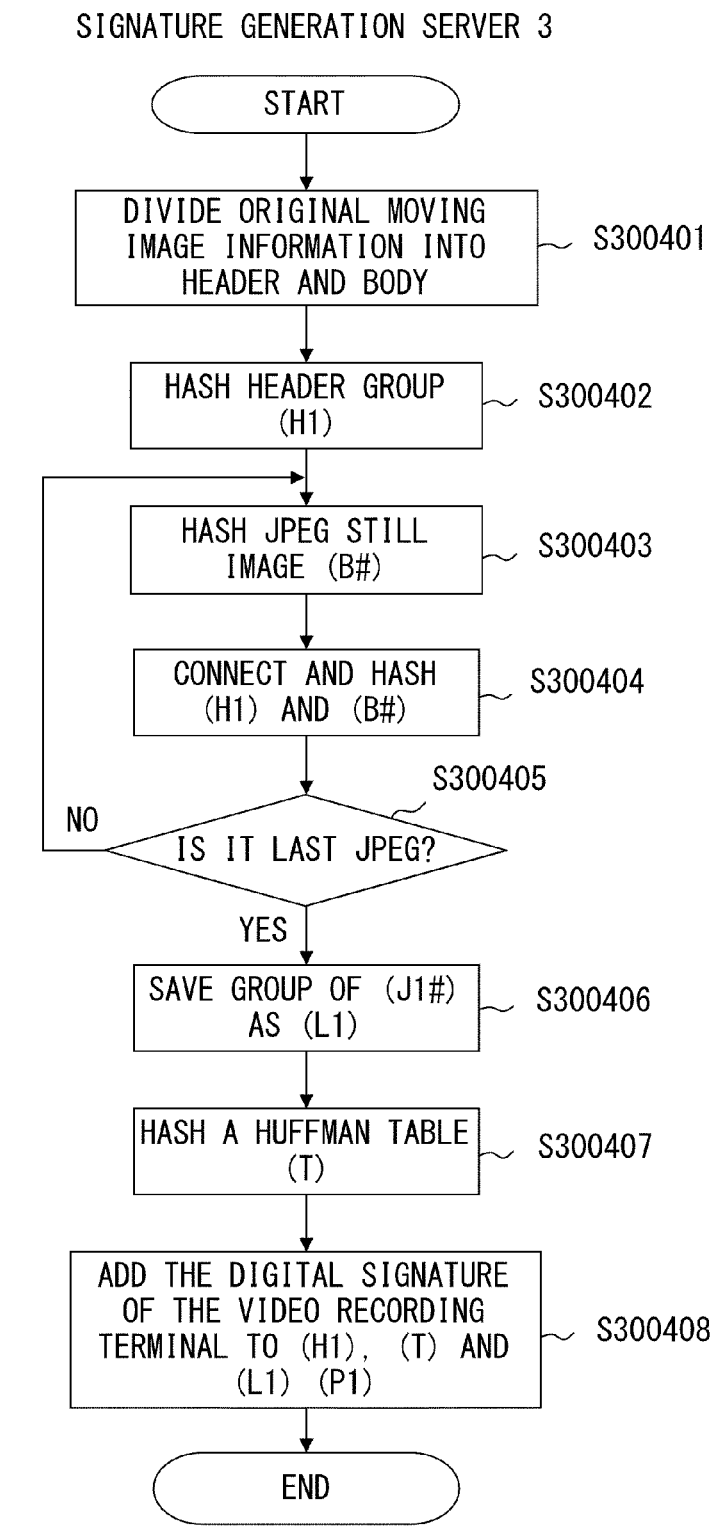
FIG. 11 is a flowchart illustrating the PIAT signature information generation of the original moving image information performed by the system in accordance with an embodiment.

The signature generation unit 33 generates signature information for original moving image information. FIG. 11 is a detailed flowchart of the generation method of the signature information and FIG. 12 illustrates a schema of the generation method of the signature information.

More particularly, original moving image information is divided into a header and a body in order to cope with the problem of header alteration of the original moving image information (i.e., to manage original moving image information and JPEG still images included in the original moving image information together as a pair) (S300401) and the item group of the header portion is hashed to generate the header hash value (H1) of the original moving image information (S300402). This constitutes the first group hash value generation unit of the present invention.

Then, a plurality of pieces of JPEG data are sequentially extracted from the head and a hash value (B#) is generated (S300403). This constitutes the first still image data hash value generation unit of the present invention. Furthermore, the header hash values (H1) of the original moving image information and (B#) are connected to generate the hash value (J1#) of each piece of JPEG data (S300404). This constitutes the first connected hash value generation unit of the present invention. If the process up to the last piece of JPEG data is completed (YES in S300405), a group of hash values (J1#) of each piece of JPEG data are saved as a hash value list (L1) (S300406). This constitutes the list generation unit of the present invention.

Then, the hash value (T) of a Huffman table is generated taking into consideration the condition that one JPEG still image is cut out. This constitutes the Huffman table generation unit of the present invention. Lastly, (H1), (T) and (L1) are added to the digital signature of a video recording terminal as the verification data of the original moving image information (S300408). This is specified as the PIAT signature information (P1) of the original moving image information. This constitutes the first signing unit of the present invention.

After the generation of the PIAT signature information of the original moving image information is completed, the original moving image information and the PIAT signature information (P1) are stored as a pair in the document management DB 31 via the document management TB 32 in the signature generation server 3 (S3005). Then, the signature generation server 3 transmits the original moving image information and the PIAT signature information (P1) to the information extraction server 5 via the communication unit 34 (S3006).

The information extraction server 5 receives the original moving image information and the PIAT signature information (P1) via the communication unit 55 (S3007), pairs the original moving image information and the PIAT signature information (P1) via the document management DB 52 in the information extraction server 5, and stores them in the document management DB 51 (S3008).

Then, the extractor receives the generate-complete notice of the original moving image information from the manager via a communication unit and starts the cutting out process of the original moving image information. This is performed when, for example, it is requested that the original moving image information be disclosed to a third party, and only necessary portions are extracted and disclosed. More particularly, it is considered that since a portion of the original moving image information includes private information, this portion of the original moving image information is cut out.

Figure 13A:
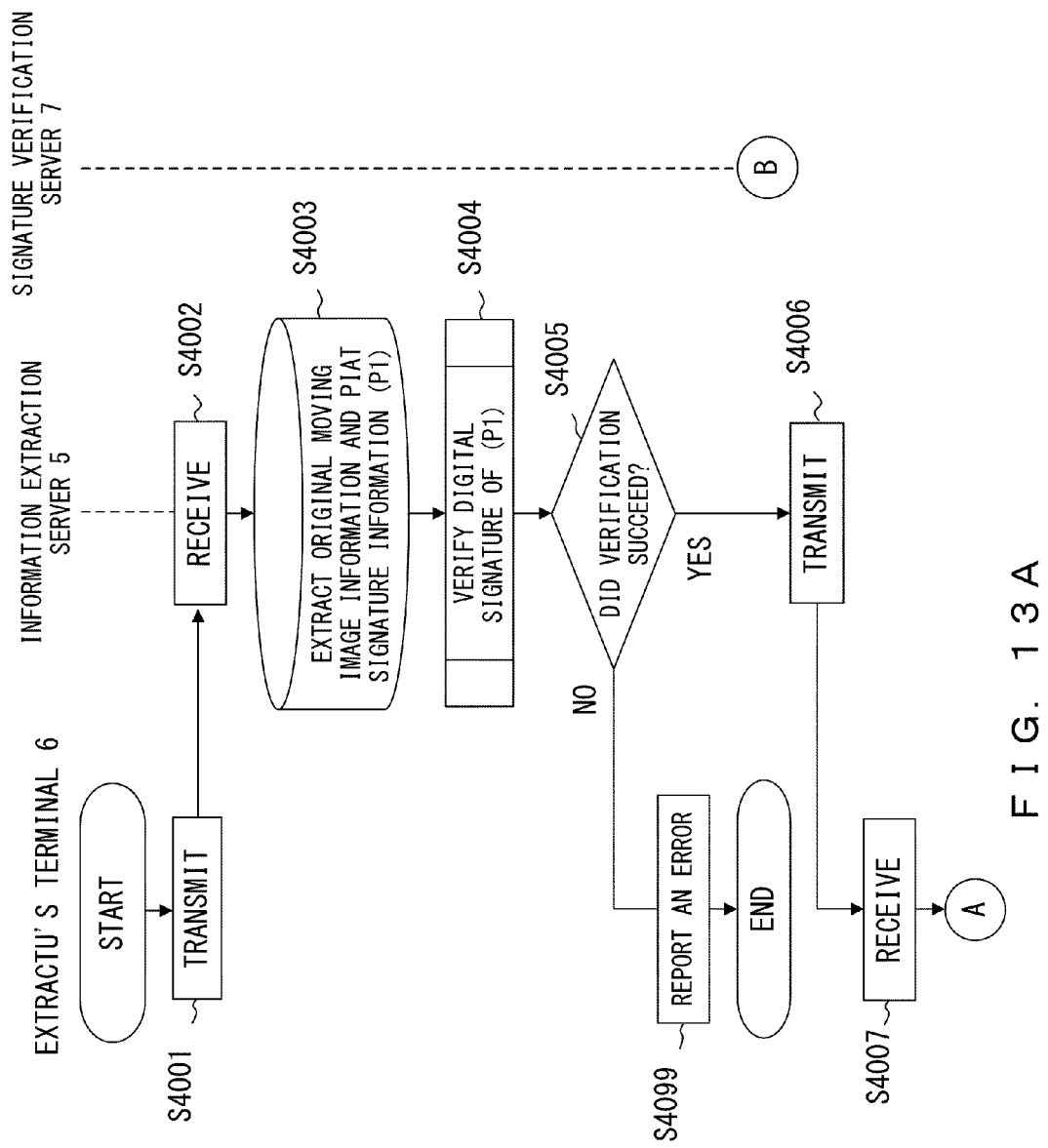
FIGS. 13A and 13B are flowcharts illustrating the generation process of cut out information and the signature generation process performed by the system in accordance with an embodiment.
Figure 13B:
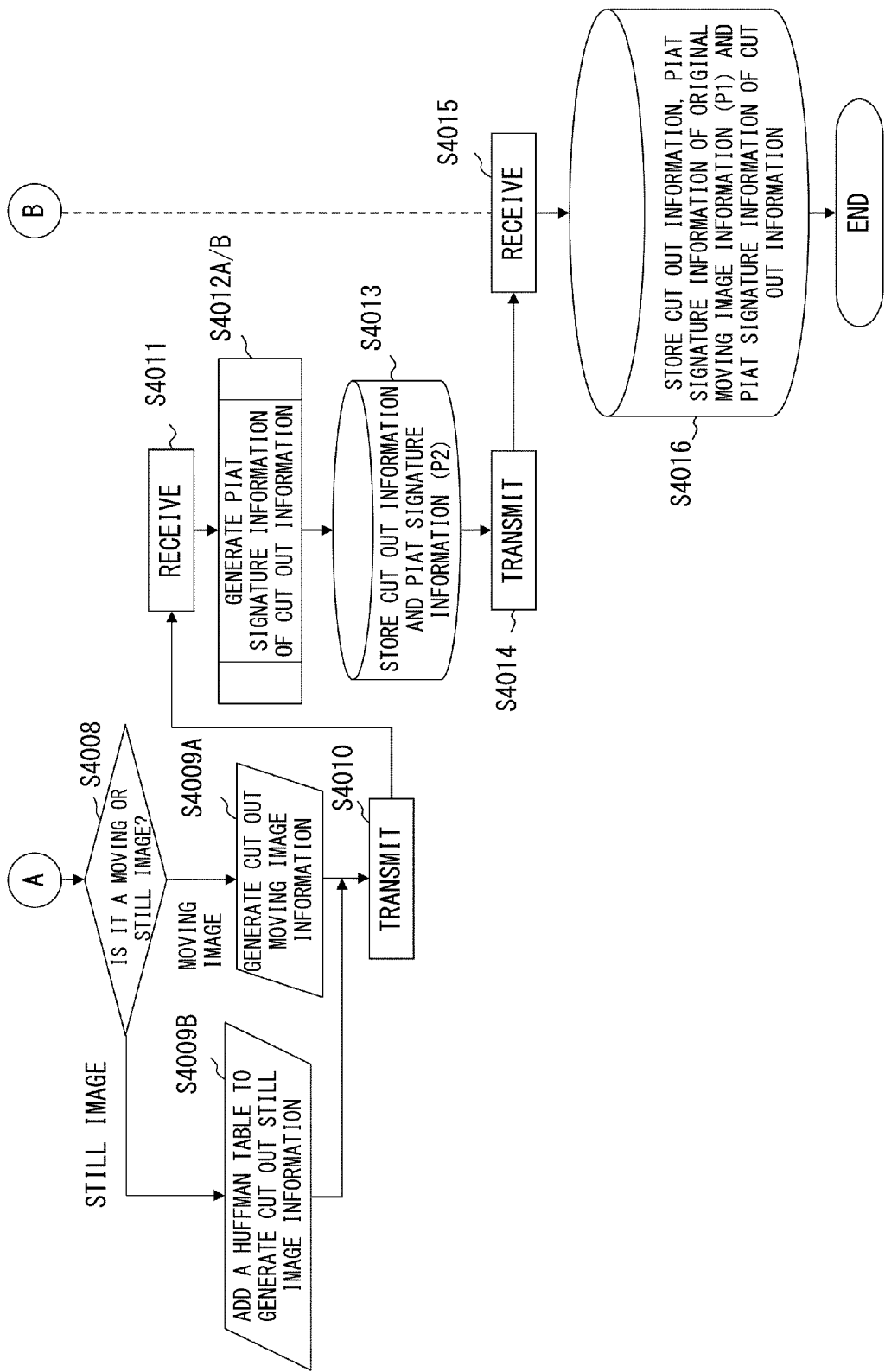

FIGS. 13A and 13B are a flowchart illustrating the generation process of cut out information and a signature generation process.

The extractor transmits an instruction to take cut out target original moving image information to the information extraction server 5 using the extractor's terminal 6 (S4001). The information extraction server 5 receives the instruction to take the cut out target original moving image information (S4002). The cut out target original moving image information and PIAT signature information stored in the document management DB 51 are taken via the document management TB 52 in the information extraction server 5 (S4003) and the digital signature attached to the PIAT signature information is verified via the signature verification unit 54 (S4004).

If the digital signature verification fails (No in S4005), the fact that an alteration has occurred is reported to the extractor (S4099).

If the digital signature verification succeeds (YES in S4005), the original moving image information is transmitted to the extractor's terminal 6 (S4006).

When the original moving image information is received by the extractor's terminal 6 (S4007), the original moving image information is displayed on a display device mounted on the extractor's terminal 6. Then, the extractor extracts necessary portions from the original moving image information to generate cut out moving image information or cut out still image information (S4008 and S4009A/B). At this moment, its header item is modified when cut out moving image information is generated, and a Huffman table is added when cut out still image information is generated.

Figure 15:
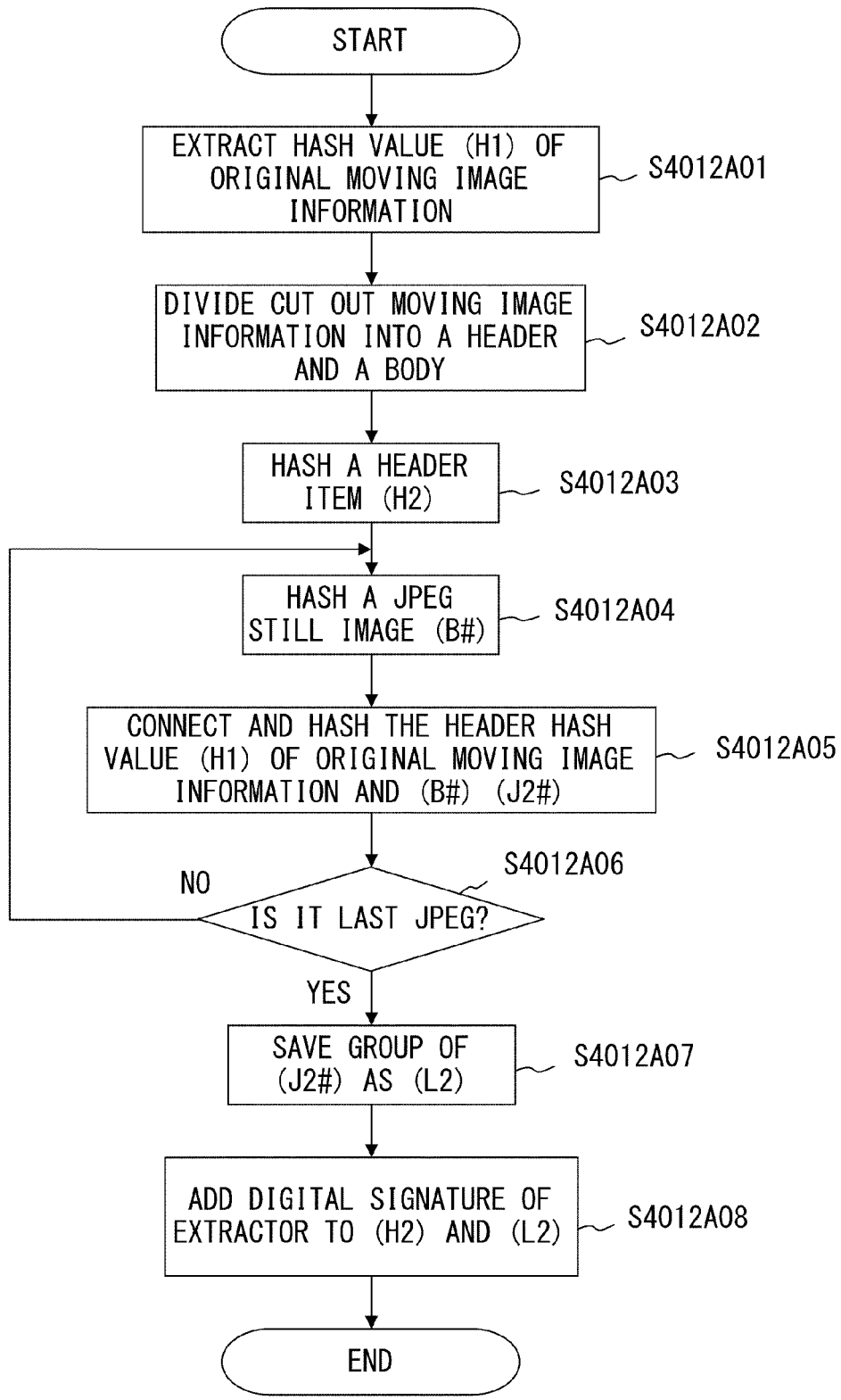
FIG. 15 is a flowchart illustrating the PIAT signature information generation of cut out moving image information performed by the system in accordance with an embodiment.
Figure 16:
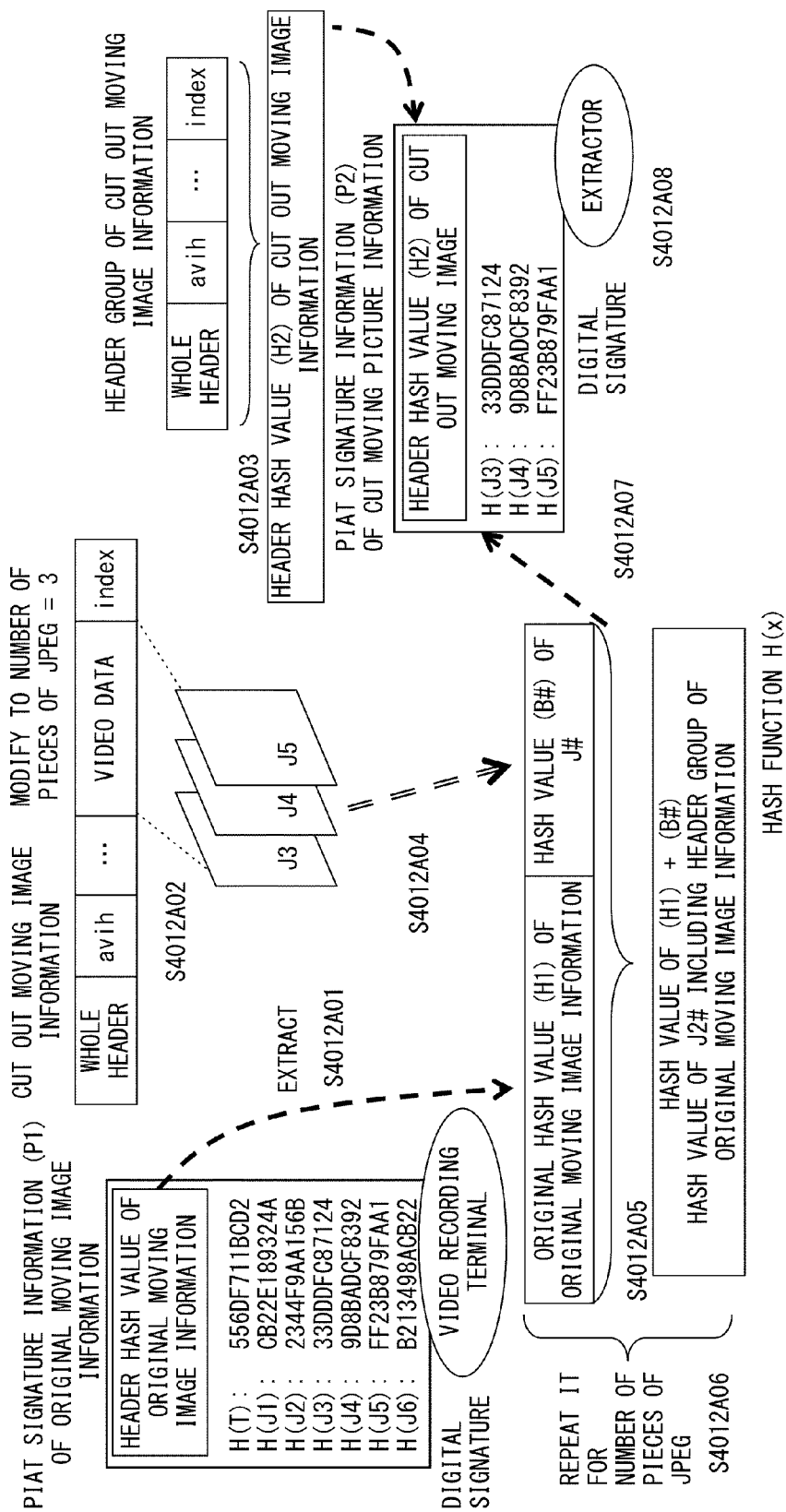
FIG. 16 illustrates the PIAT signature information generation of cut out moving image information performed by the system in accordance with an embodiment.
Figure 17:
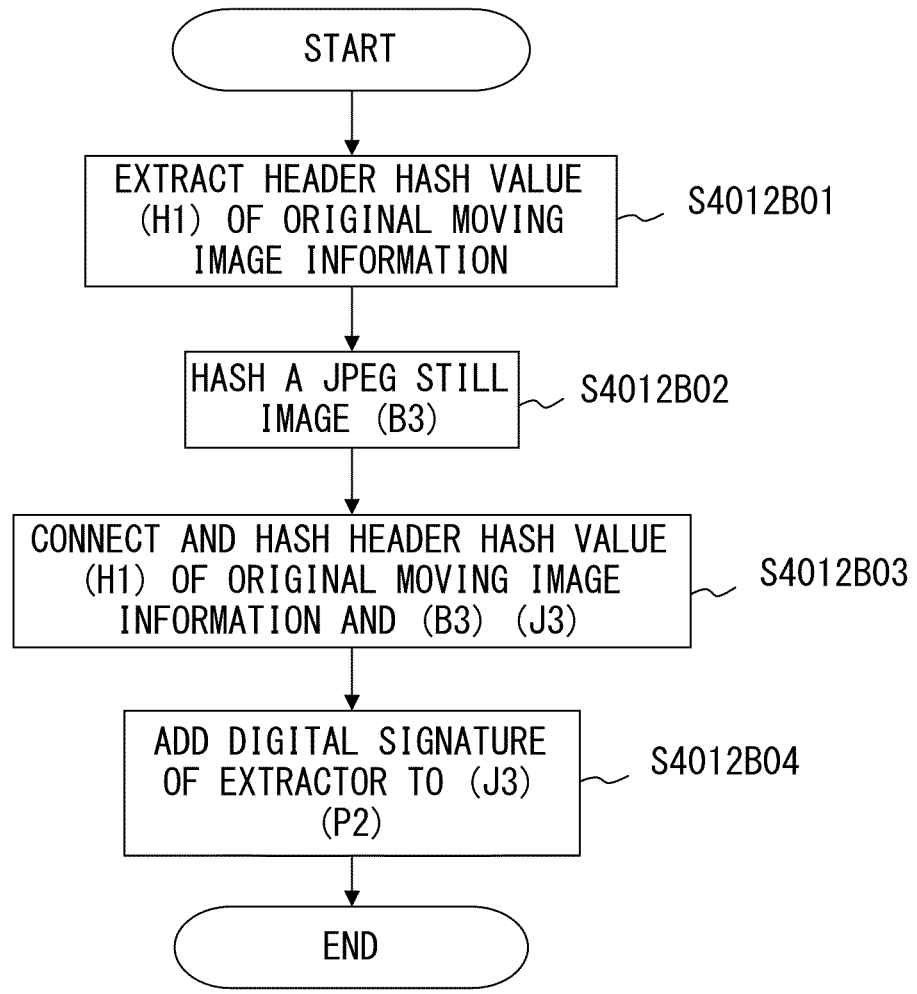
FIG. 17 is a flowchart illustrating the PIAT signature information generation of cut out still image information performed by the system in accordance with an embodiment.
Figure 18:
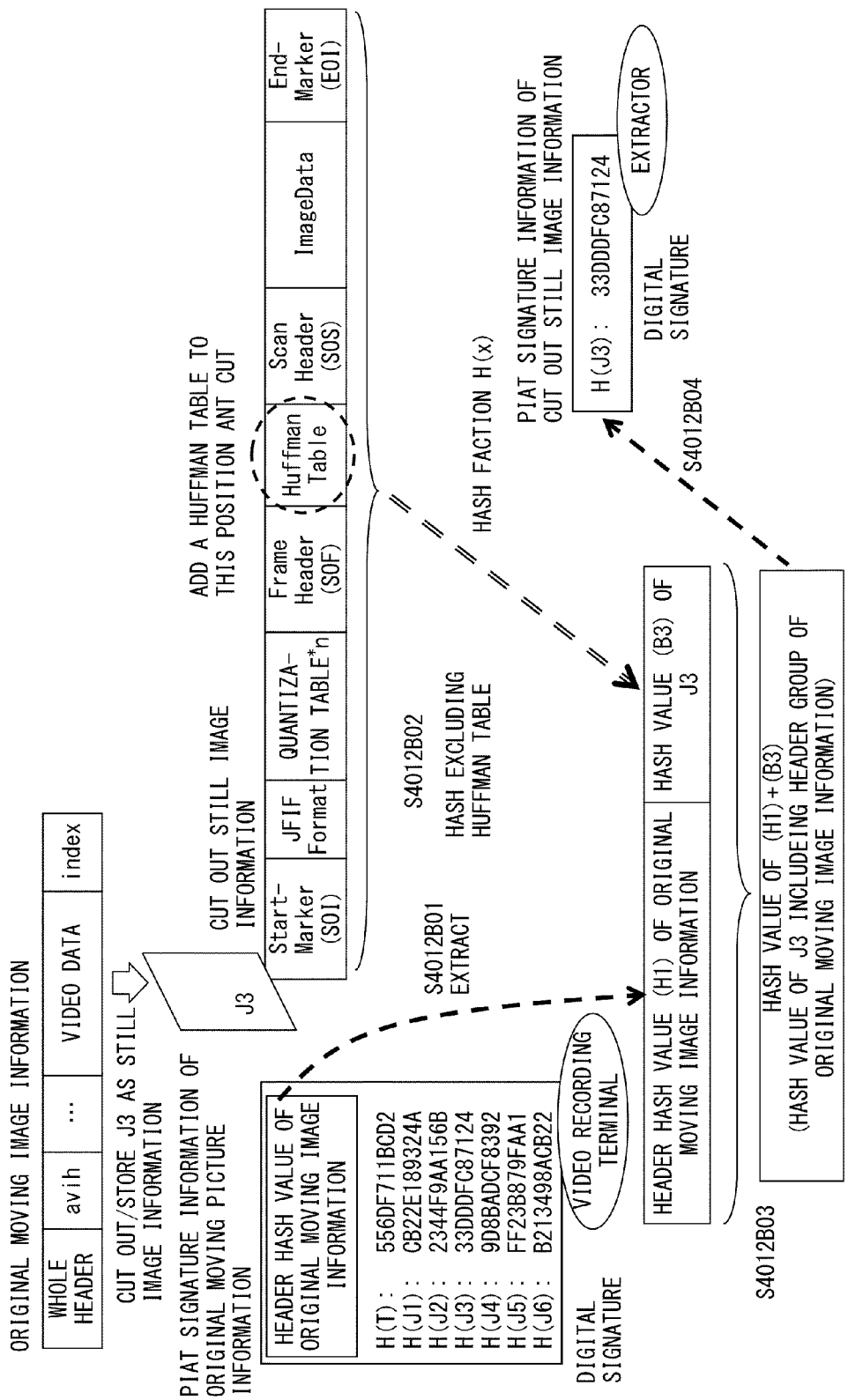
FIG. 18 illustrates the PIAT signature information generation of cut out still image information performed by the system in accordance with an embodiment.

FIG. 15 and FIG. 16 illustrate the generation of cut out moving image information and its signature generating method respectively. FIG. 17 and FIG. 18 illustrate the generation of cut out still image information and its signature generation method respectively.

In the embodiment, it is assumed that there are six pieces of JPEG data, and a case where three pieces of JPEG data, J3 through J5, are extracted as cut out moving image information and a case where a J3 is extracted as cut out still image information are explained.

In the modification of the header item at the generation time of cut out moving image information, the number of JPEG frames is modified from 6 to 3, in the addition of the Huffman table at the generation time of cut out still image information, a JPEG format is analyzed and it is added between a FrameHeader (SOF) and ScanHeader (SOS). This constitutes the frame number modification unit of the present invention.

Figure 14:
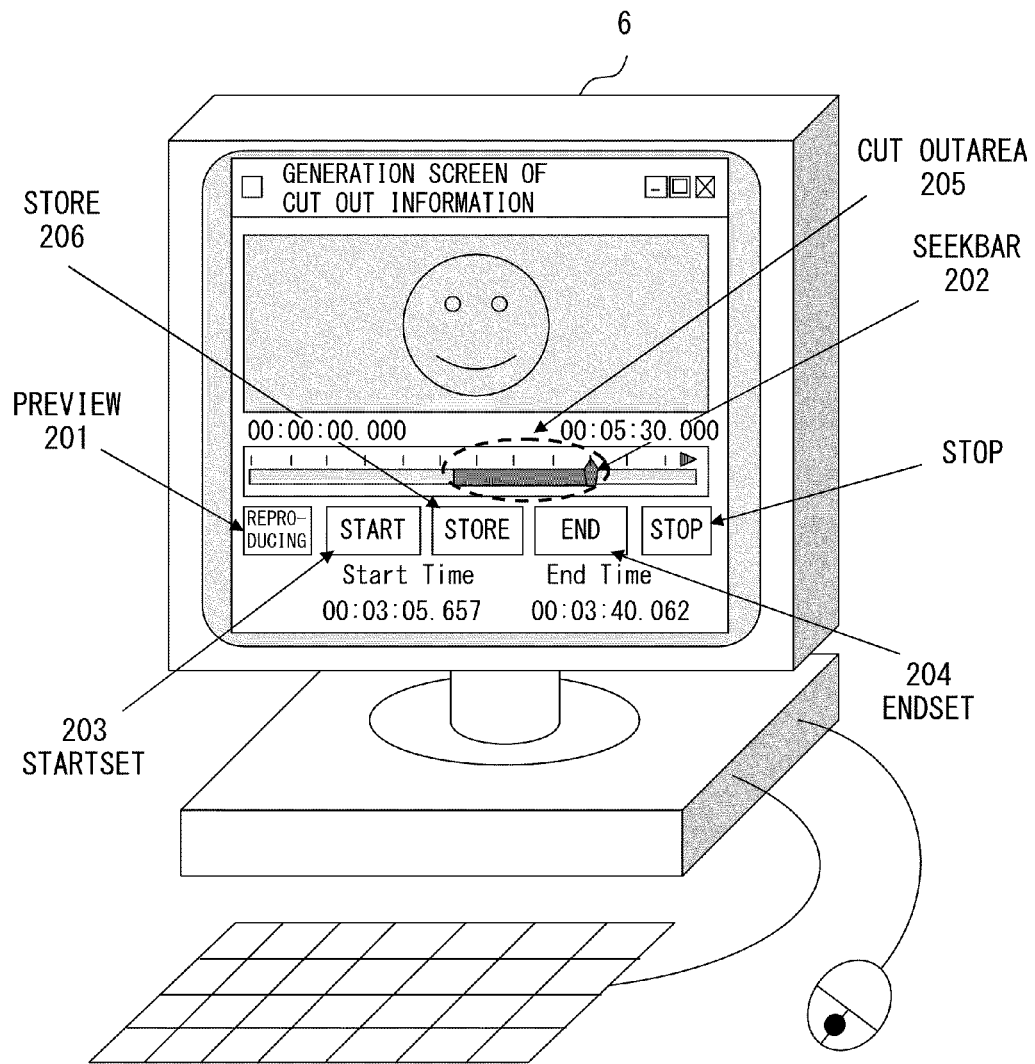
FIG. 14 illustrates the generation process of cut out information performed by the system in accordance with an embodiment.

FIG. 14 is one example of the extracting operation of original moving image information by the extractor's terminal 6. The extractor can cut it out using visual reckoning by specifying a necessary cut out scope while reproducing the cut out moving image information using a reproducing button (PREVIEW) 201. As its cutting out method, firstly, a start button (STARTSET) 203 is pressed down at an arbitrary position using a seek bar 202 to set a cut out start position. Then, in the same way, an end button (ENDSET) 204 is pressed down at an arbitrary position using the seek bar 202 to set a cut out end position. Since a cut out area 205 is determined by this operation, the generation menu of cut out moving image information is selected and cut out moving image information is generated.

When it is cut out as a still image, a store button (STORE) 206 is pressed down at an arbitrary position in the same way using the seek bar 202 to generate cut out still image information. Hereinafter cut out moving image information and cut out still image information are collectively described as cut out information.

After the generation of the cut out information is completed, the generated cut out information is transmitted to the information extraction server 5 (S4010). Upon receipt of the cut out moving image information (S4011), the signature generation unit 53 in the information extraction server 5 generates PIAT signature information for the cut out information (S4012A/B).

Next, the signature generating method of the cut out moving image information is explained with reference FIG. 15. Firstly, the header hash value (H1) of original moving image information is extracted from the PIAT signature information of the original moving image information (S4012A01). This constitutes the first hash value extraction unit of the present invention.

In order to cope with the header alteration problem of the cut out moving image information, the cut out moving image information is divided into a header and a body (S4012A02) and the item group of the header portion is hashed to generate the header hash value (H2) of the cut out moving image information (S4012A03). This constitutes the second group hash value generation unit of the present invention. Then, the JPEG data of the cut out moving image information is sequentially extracted from the head to generate a hash value (B#) (S4012A04). This constitutes the second still image data hash value generation unit of the present invention.

Furthermore, the header hash value (H1) of the original moving image information and (B#) are connected to generate the hash value (J2#) of each piece of JPEG data (S4012A05). This constitutes the second connected hash value generation unit of the present invention. If the process up to the last piece of JPEG data is completed (YES in S4012A06), a group of (J2#) is saved as a hash value list (L2) (S4012A07). This constitutes the second list generation unit of the present invention. Lastly, (H2) and (L2) are added to the digital signature of the extractor as the verification data for the cut out moving image information (S4012A08). This is specified as the PIAT signature information (P2) of the cut out moving image information. This constitutes the second signing unit of the present invention.

Next, the signature generating method of cut out still image information is described with reference to FIG. 17. As illustrated in FIG. 18, firstly a cut out portion of the JPEG still image information is specified to generate a cut out still image. At that time, a Huffman table is attached to its proper position in such a way that it can be drawn. Then, the header hash value (H1) of original moving image information is extracted from the PIAT signature information of the original moving image information (S4012B01). This constitutes the second hash value extraction unit of the present invention. Then, the hash value (B#=B3) of JPEG data is generated (S4012B02). Furthermore, the header hash value (H1) of the original moving image information and (B3) are connected to generate the hash value (J3) of JPEG data (S4012B03). This constitutes the third connected hash value generation unit of the present invention. Lastly, the extractor's digital signature is added using (J3) as the verification data of the cut out still image information (S4012B04). This is specified as the PIAT signature information of the cut out still image information. This constitutes the third signing unit of the present invention.

After the generation of the PIAT signature information of the cut out information is completed, the cut out moving image information and the PIAT signature information are stored as a pair in the document management DB 51 via the document management TB 52 in the information extraction server 5 (S4013). Then, the information extraction server 5 transmits three pieces of information, the cut out information, the PIAT signature information of the original moving image information, and the PIAT signature information of the cut out information, to the signature verification server 7 via the communication unit 55 (S4014).

The signature verification server 7 receives these three pieces of information, the cut out information, the PIAT signature information of the original moving image information, and the PIAT signature information of the cut out information, via the communication unit 74 (S4015), and stores these three pieces of information, the cut out information, the PIAT signature information of the original moving image information, and the PIAT signature information of the cut out information, in the document management DB 71 via the document management TB 72 in the signature verification server 7 (S4016).

Figure 20:
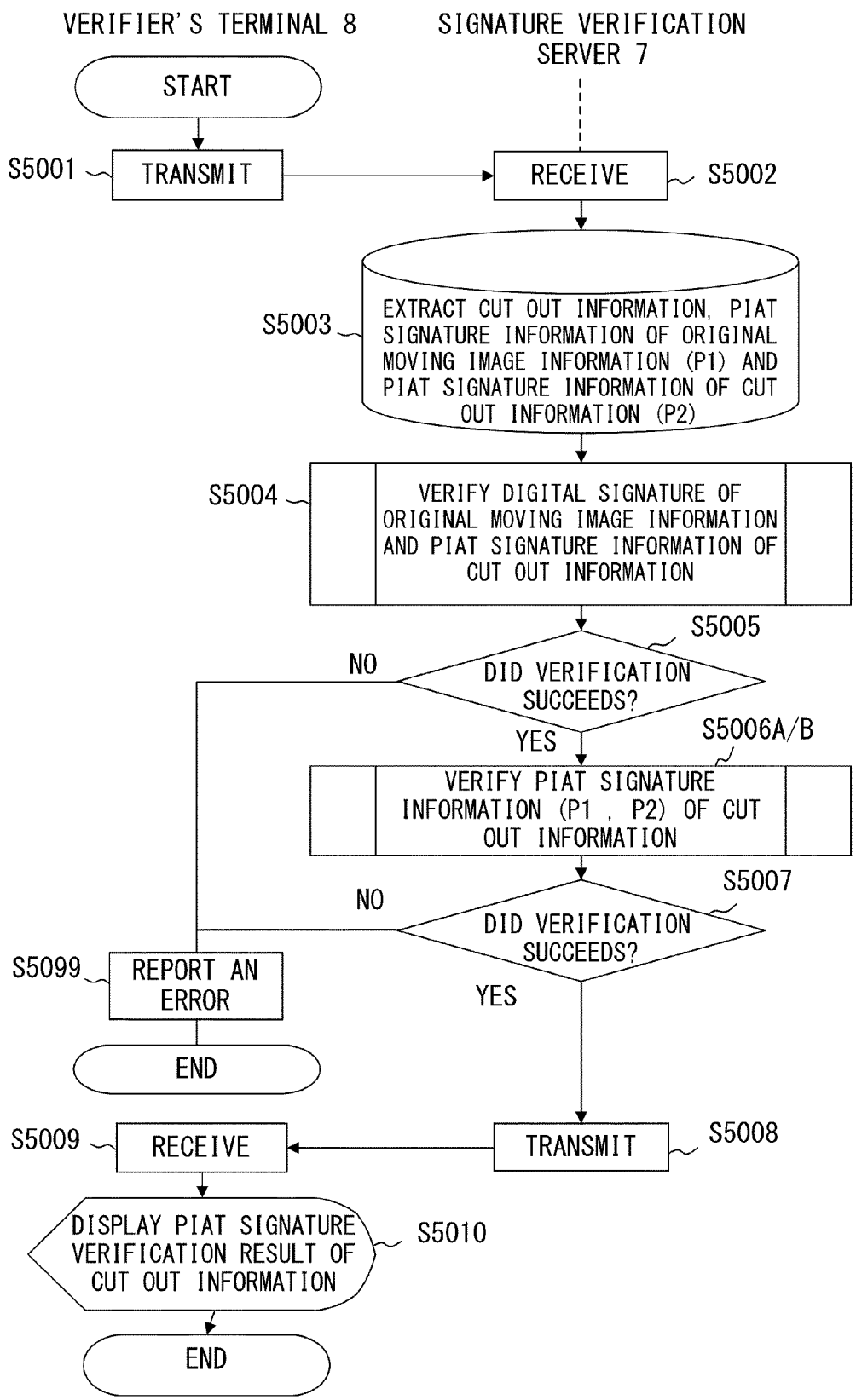
FIG. 20 is a flowchart illustrating the signature verification process of original moving image information and information of the cut out moving image performed by the system in accordance with an embodiment.

FIG. 20 is the flowchart of the signature verification process of original moving image information and cut out information.

The verifier receives the disclosure notice of the cut out information from the extractor via a communication unit and starts checking the disclosed cut out information to verify it.

The verifier transmits an instruction to extract verification-target cut out information to the signature verification sever 7 using the verifier's terminal 8 (S5001). The verifier verifies either the cut out moving image information or the cut out still image information as cut out information.

Figure 19:
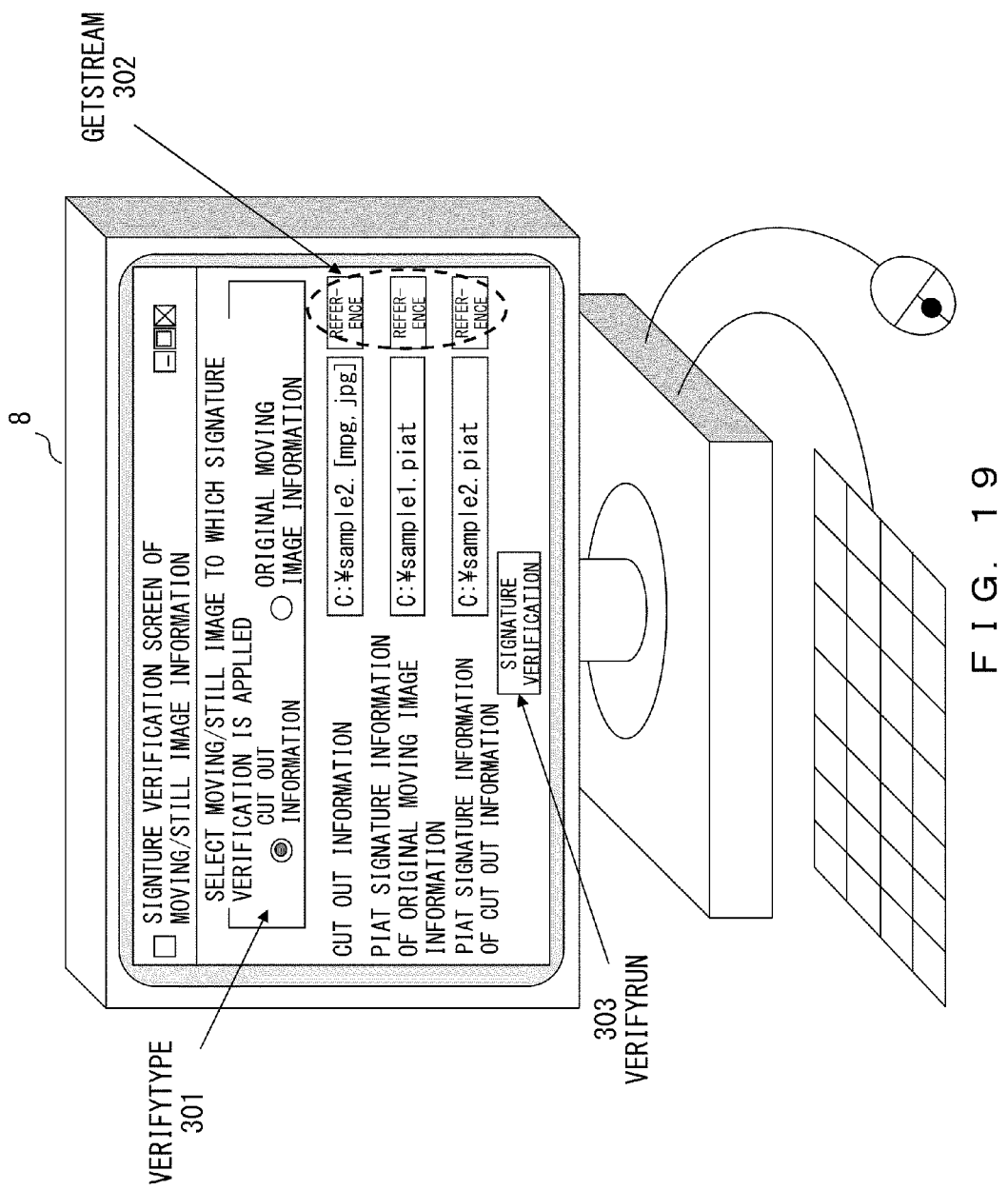
FIG. 19 illustrates the selection screen for the moving/still image information and verification information of a verification target in accordance with an embodiment.

FIG. 19 is one example of the selection screen of verification-target moving/still image information and its verification information. In this example, in signature verification, either cut out information or original moving image information can be selected, and each piece of moving and still image information can be verified (VERIFYTYPE 301). For example, when cut out information is selected, the cut out information, the PIAT signature information of original moving image information, and the PIAT signature information of the cut out information can be selected, by pressing the reference button (GETSTREAM) 302 of each field.

It is also designed in such a way that cut out information stored in the document management DB 71 of the signature verification server 7 can be referenced/selected by pressing the reference button 302. Lastly, the signature verification of the selected cut out information can be performed by pressing a signature verification button (VERIFYRUN) 303.

Although in this example a verifier selects the PIAT signature information of original moving image information and the PIAT signature information of cut out information, there is another embodiment in which the verifier also select only cut out information without being aware of the existence of these pieces of PIAT signature information. For example, a verifier can also select cut out information by attaching a title which can easily estimate/recognize the content of cut out information and by showing the verifier a list collecting those titles. In this case, when moving/still image information on the list is selected, it is necessary to store, for example, link information for determining which moving/still image information stored in the document management DB 71 of the signature verification server 7 is the selected moving/still image information.

When the signature verifying process is performed, the signature verification server 7 receives an instruction to extract verification-target cut out information (S5002). This constitutes the first receiving unit of the present invention. Three pieces of information, the cut out information stored in the document management DB 71, the PIAT signature information of original moving image information, and the PIAT signature information of cut out information, are extracted via the document management TB 72 in the signature verification server 7 (S5003) and a digital signature attached to the PIAT signature information is verified via the signature verification unit 73 (S5004). Then, the verification result is determined (S50005). If the digital signature verification fails (NO in S5005), it is determined that an alteration has been made, and this fact is reported to the verifier (S5099).

If the digital signature verification succeeds (YES in S5005), then the PIAT signature information of the cut out information is verified (S5006A/B).

Cut out information includes cut out moving and still image information. The cut out moving image information is explained with reference to FIG. 21 and FIG. 22. The cut out still image information is explained with reference to FIG. 23 and FIG. 24.

Figure 21:
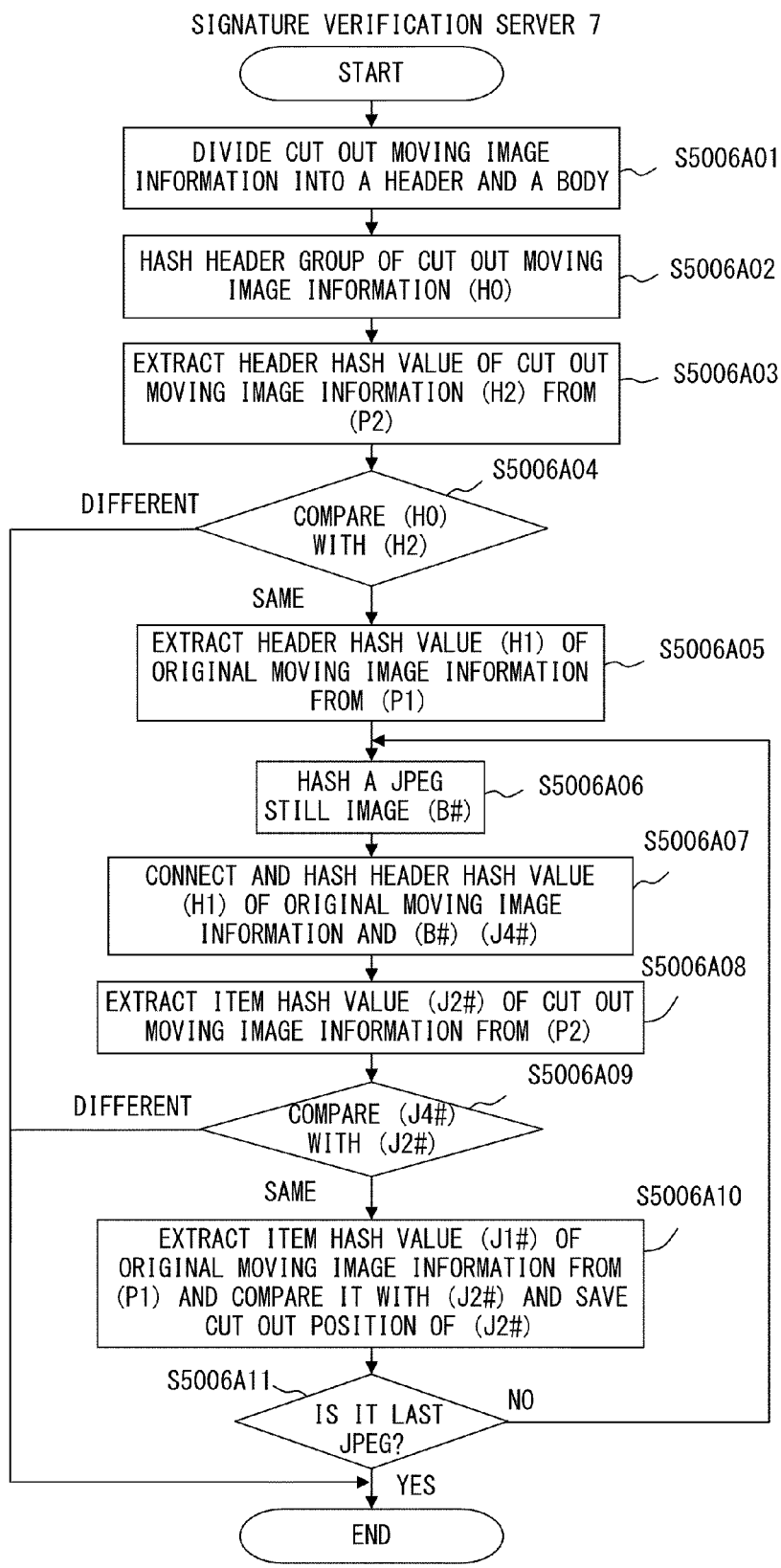
FIG. 21 is a flowchart illustrating the PIAT signature information verification process of cut out moving image information performed by the system in accordance with an embodiment.

Firstly, the verification of the PIAT signature information of cut out moving image information is explained with reference to FIG. 21 and FIG. 22. Cut out moving image information is divided into a header and a body (S5006A01). The item group of the header portion is hashed to generate the header hash value (H0) of the cut out moving image information (S5006A02).

Then, the header hash value (H2) of the cut out moving image information is extracted from the PIAT signature information (P2) of the cut out moving image information (S5006A03) and is compared with (H0) (S5006A04). This comparison determination process constitutes the first determination unit of the present invention.

If they are different (NO in S5006A04), it is determined that an alteration has been made to the header portion of the cut out moving image information and this fact is reported. If they are the same (YES in S5006A04), the header hash value (H1) of the original moving image information is extracted from the PIAT signature information (P1) of the original moving image information (S5006A05). This constitutes the first group hash value extraction unit of the present information. A plurality of pieces of JPEG data is sequentially extracted from the head to generate a hash value (B#) (S5006A06). This constitutes the fourth still image data hash value generation unit of the present invention.

Furthermore, the header hash value (H1) of the original moving image information and (B#) are connected to generate the hash value (J4#) of each piece of JPEG data (J4#) (S5006A07). This constitutes the fourth connected hash value generation unit of the present invention. Simultaneously, the corresponding item hash value (J2#) is extracted from the PIAT signature information (P2) of the cut out moving image information (S5006A08) and is compared with (J4#) (S5006A09). This comparison determination process constitutes the second determination unit of the present invention.

If they are different (NO in S5006A9), it is determined that an alteration has been made to the (J4#) of the cut out moving image information and this fact is reported. If they are the same (YES in S5006A9), the corresponding item hash value (J1#) is extracted from the PIAT signature information of the original moving image information, is compared with (J2#), and the cut out position of (J2#) is saved (S5006A10). This constitutes the third determination unit of the present invention. If the process up to the last piece of JPEG data is completed (YES in S5006A11), it is reported that it has been completed normally. In the case of the embodiment, of six frames, three frames, J3, J4 and J5, are cut out as the moving image information and it can be confirmed that there has been no alteration.

Figure 24:
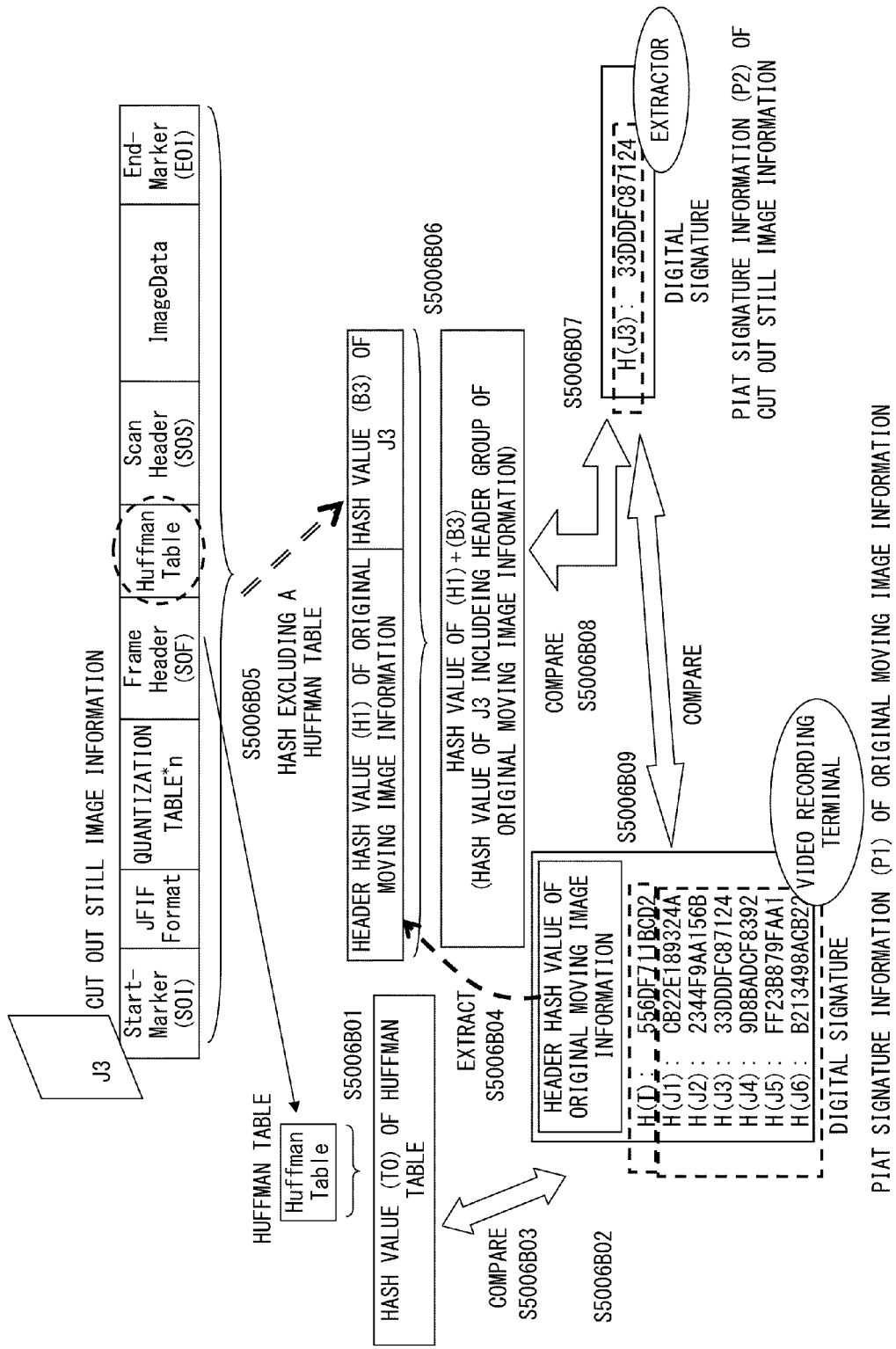
FIG. 24 illustrates the PIAT signature information verification process of cut out still image information performed by the system in accordance with an embodiment.

Then, the verification of the PIAT signature information of the cut out still image information is explained with reference to FIG. 23 and FIG. 24. When the cut out still image and the PIAT signature of the cut out still image are received (which corresponds to the second receiving unit of the present invention), the hash value (T0) of a Huffman table included in the cut out still image information is generated (S5006B01). Then, the hash value (T) of the Huffman table is extracted from the PIAT signature information of the original moving image information (S5006B02) and is compared with (T0) (S5006B03). This constitutes the fourth determination unit of the present invention. If they are different (No in S5006B03), it is determined that an alteration has been made to the Huffman table included in the cut out still image information and this fact is reported.

If they are the same (YES in S5006B03), the header hash value (H1) of the original moving image information is extracted from the PIAT signature information of the original moving image information (S5006B04). This constitutes the second group hash value extraction unit of the present invention. Then, the hash value (B3) of the JPEG data of the cut out still image is generated (S5006B05). This constitutes the fifth still image data hash value generation unit of the present invention. Furthermore, the header hash value (H1) of the original moving image information and (B3) are connected to generate the hash value (J3) of each piece of JPEG data (S5006B06). This constitutes the fifth connected hash value generation unit of the present invention.

Simultaneously, the corresponding item hash value (J3) is extracted from the PIAT signature information of the cut out still image information (S5006B07) and is compared with (J3) generated in S5006B06 (S5006B08). If they are different (No in S5006B08), it is determined that an alteration has been made to the (J3) of the cut out still image information and this fact is reported.

If they are the same (YES in S5006B08), the corresponding item hash value (J1#) is extracted from the PIAT signature information of the original moving image information, is compared with a hash value (J3) obtained from the PIAT signature information (P2) of the cut out still image information, and the cut out position of (J3) is saved (S5006B09). This constitutes the fifth determination unit and verification unit of the present invention. Then, the fact that these have been completed normally is reported. In the case of this embodiment, of six frames, the frame J3 is cut out as still image information and it can be confirmed that there has been no alteration.

If in the determination of the verification result (S5007) the PIAT signature information verification fails (NO in S5007), it is determined that an alteration has been made and this fact is reported to the verifier (S5099). If the PIAT signature information verification succeeds (YES in S5007), the verification result of the PIAT signature information of the cut out information is transmitted to the verifier's terminal 8 (S5008). When the verification result of the PIAT signature information of the cut out information is received by the verifier's terminal 8 (S5009), the verification result of the PIAT signature information of the cut out information is displayed on a display device mounted on the verifier's terminal 8 (S5010).

Figure 25:
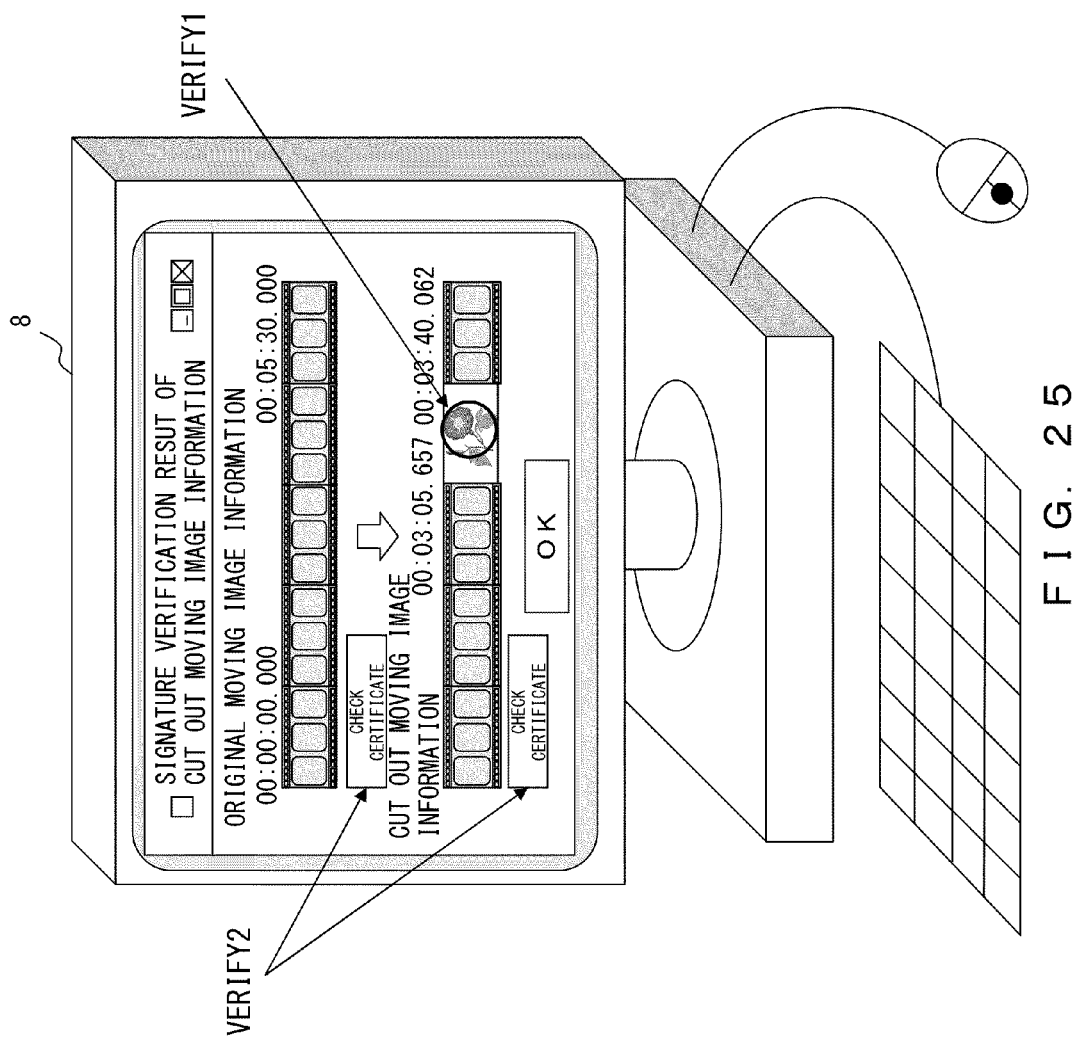
FIG. 25 illustrates the signature verification result of cut out moving image information performed by the system in accordance with an embodiment.

FIG. 25 is one example of the signature verification result of cut out moving image information which is displayed on the display device mounted on the verifier's terminal 8. The verifier can check the scope of a cut out portion showing which portion of the original moving image information has been cut out, whether the portion has been altered, and the originality of the cut out moving image information by referring to this verification result, in addition to the fact that the cut out moving image information is a portion of the original moving image information (VERIFY1). Furthermore, who has generated the original moving image information and who has cut it out (who has generated the cut out original moving image information) can be determined by checking the video recording terminal and the digital signature of the extractor (VERIFY2).

The original moving image information can also be verified. For example, when original moving image information is selected in the VERIFYTYPE301 of FIG. 19, the original moving image information and the PIAT signature information of the original moving image information can be selected (at this time, no selection of the PIAT signature information of cut out information is needed). This can be selected by pressing the reference button (GETSTREAM302 in FIG. 19) of each field. By pressing the reference button 302, original moving image information stored in the document management DB 71 of the signature verification server 7 can be referenced/selected. Lastly, the signature of selected original moving image information can be verified by pressing the signature verification button (VERIFYRUN303 in FIG. 19).

FIG. 26 is one example of the signature verification result of cut out still image information which is displayed on the display device mounted on the verifier's terminal 8. The verifier can check the scope of a cut out portion showing which portion of the original moving image information has been cut out, whether the portion has been altered, and the originality of the cut out still image information by referring to this verification result, in addition to the fact that the cut out still image information is a portion of the original moving image information (VERIFY1). Furthermore, who has generated the original moving image information and who has cut it out (who has generated the cut out original moving image information) can be determined by checking the video recording terminal and the digital signature of the extractor (VERIFY2).

A method for managing hash information by a binary tree using the technology disclosed in Patent document 1 can also be used in order to reduce the amount of data of PIAT signature information.

In the embodiment, the cutting out of each piece of moving and still image information is possible. Furthermore, moving image information extracted in each media format can be reproduced normally and still image information can be drawn normally. Simultaneously, even when a portion of original moving image information is cut out as moving or still image information in order to protect privacy and the like, it can be proven to a third party that it is a portion of the original picture and that it has not been altered in addition to the checking of the cut out place (position) of the cut out moving or still image information. Since its extractor is clarified from the digital signature of the PIAT signature information, even when the extractor has applied an alteration/addition to cut out moving/still image information, it can be traced.

Figure 27:
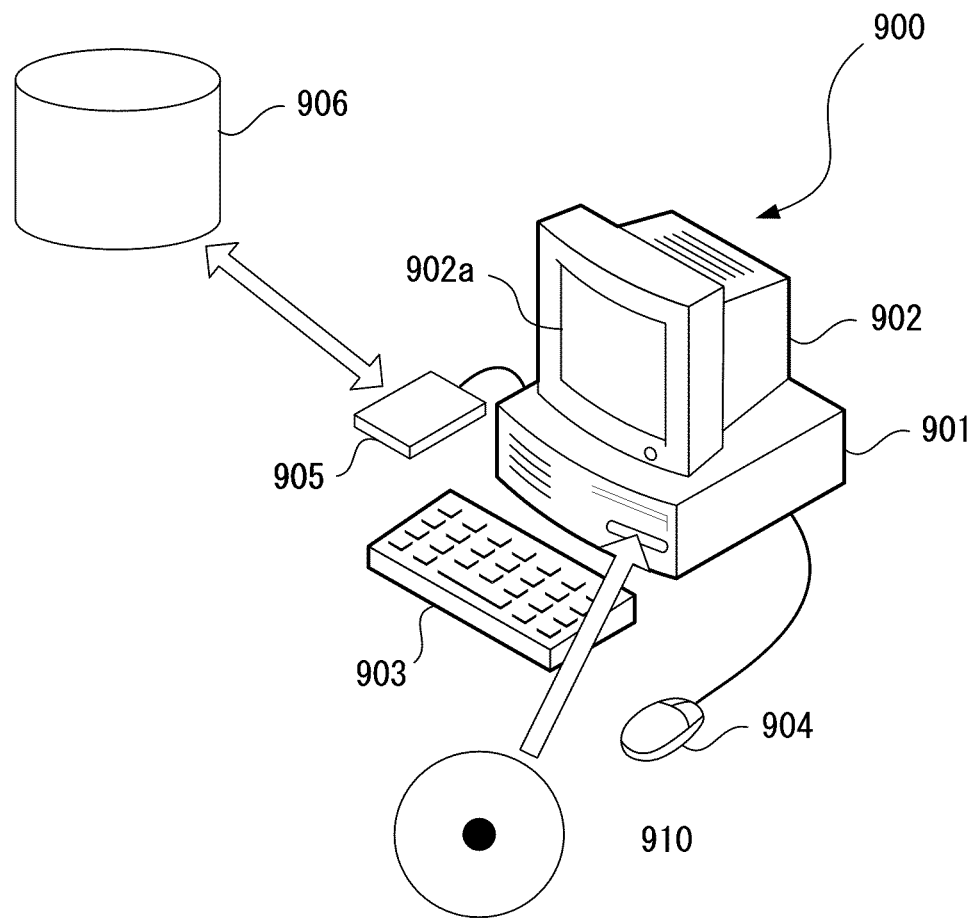
FIG. 27 is one example of the computer system in accordance with an embodiment.

One example of the configuration of each computer system illustrated in FIG. 1 and the like is illustrated in FIG. 27.

The computer system 900 illustrated in FIG. 27 includes a main body 901 in which a CPU, a disk drive, and the like are built in, a display 902 for displaying images according to instructions from the main body 901, a keyboard 903 for inputting various pieces of information to the computer system 900, a mouse 904 for specifying an arbitrary position on the display screen 902a of the display 902, and a communication device 905 for accessing an external database and the like and downloading a program and the like stored in another computer system. The communication device 905 includes a network communication card, a modem, and the like.

A program for executing the above-described respective steps on the above-described computer system constituting the video data management device can be provided as a video management program. This program can enable the computer system constituting the video management device to execute the respective steps by storing it in a storage medium which can be read by the computer system.

The above-described program for executing the respective steps is stored in a portable recording medium, such as a disk 910 or the like, or is downloaded from the recording medium 906 of another computer system by the communication device 905. This program can be also stored in a computer-readable recording medium such as the disk 910 or the like. This recording medium which can be read by the computer system 900 includes an internal storage device internally mounted on a computer such as ROM, RAM or the like, a portable storage medium such as an IC card or the like, and a database for storing a computer program and various recording media which can be accessed by another computer system, the other computer system's database, or a computer system connected via a communication unit such as the communication device 905.

INDUSTRIAL APPLICABILITY

According to the embodiment described in detail above, a technology capable of cutting out a video picture and a still image, normally reproducing (drawing) the image extracted in each media format, and proving to a third party that the extracted video picture or still image is a portion of the original picture and has not been altered can be provided.

What is claimed is:

1. An image managing method for managing an original moving image and a still image included in the original moving image together as a pair, comprising:
   in the case of generating a signature of original moving image information
   dividing the original moving image into a header and a body and generating a group hash value (H1) of a header portion,
   generating a hash value (B#) of each piece of still image data,
   connecting the hash value (H1) of the header portion and the hash value (B#) of each piece of still image data to generate each connected hash value (J1#),
   generating a group of connected hash values (J1#) as a hash value list (L1),
   generating a hash value (T) of a Huffman table on the basis of cutting out one still image, and
   signing to generate signature information of the original moving image, using the group hash value (H1) of the header portion, the hash value (T) of the Huffman table, and the hash value list (L1) as verification data of the original moving image, by adding a digital signature of a video recording terminal to it.

2. The image managing method according to claim 1, comprising:
   in the case of generating and storing cut out moving image information
   specifying a still image of a portion cut out from the original moving image, generating a cut out moving image, and modifying the number of frames in such a way that header items can be reproduced,
   extracting a group hash value (H1) of a header portion from signature information of an original moving image,
   dividing the cut out moving image into a header and a body and generating an item group hash value (H2) of a header portion,
   generating a hash value (B#) of each piece of still image data of the cut out moving image,
   connecting the group hash value (H1) of the header portion obtained from signature information of the original moving image and the hash value (B#) of each piece of still image data of the cut out moving image to generate a hash value (J2#) of each piece of still image data,
   specifying a group of the connected hash values (J2#) as a hash value list (L2), and
   signing to generate signature information of the cut out moving image, using the group hash value (H2) of the header portion and the hash value list (L2) as verification data for the cut out moving image, by adding a digital signature of an extractor to it.

3. The image managing method according to claim 1, comprising:
   in the case of generating and storing cut out still image information specifying a still image of a portion to be cut out, generating a cut out still image, and attaching a Huffman table to the cut out still image in a proper place in such a way that it can be drawn, extracting a hash value (H1) of a header portion from signature information of an original moving image, generating a hash value (B3) of the cut out still image data, connecting the hash value (H1) of the header portion extracted from the signature information of the original moving image and the hash value (B3) of the cut out still image data to generate a connected hash value (J3) of each piece of still image data, and signing to generate signature information of the cut out still image, using the connected hash value (J3) generated in the generating of the connected hash value as verification data for the cut out still image, by adding a digital signature of an extractor to it.

4. The image managing method according to claim 2, comprising:

in the case of verifying cut out moving image information obtaining a cut out moving image, signature information of the cut out moving image, and signature information of the original moving image, dividing the cut out moving image into a header and a body, generating an item group hash value (H0) of a header portion, and comparing it with a hash value (H2) included in the signature information of the cut out moving image and determining whether they are the same, extracting a header group hash value (H1) included in the signature information of the original moving image, generating a hash value (B#) of each piece of still image data of the cut out moving image, connecting the header group hash value (H1) extracted from the signature information of the original moving image and each generated hash value (B#) to generate a connected hash value (J4#) of each piece of still image data, comparing the connected hash value (J2#) of a hash value list (L2) included in the signature information of the cut out moving image with the generated connected hash value (J4#) and determining whether they are the same, and comparing the connected hash value (J1#) of the hash value list (L1) included in the signature information of the original moving image with the connected hash value (J2#) of the hash value list (L2) included in the signature information of the cut out moving image and determining whether their cut points are the same.

5. The image managing method according to claim 3, comprising:

in the case of verifying cut out still image information obtaining a cut out still image, signature information of the cut out still image, and signature information of the original moving image, generating a hash value (T0) of a Huffman table included in the cut out still image, comparing it with a hash value (T) of the Huffman table included in the signature information of the original moving image, and determining whether they are the same, extracting a group hash value (H1) of a header portion included in the signature information of the original moving image, generating a hash value (B3) of each piece of cut out still image data, connecting the header group hash value (H1) extracted from the signature information of the original moving image and the hash value (B3) of each piece of generated still image data to generate a connected hash value (J3), comparing the connected hash value (J3) generated by the generating the connected hash value with the hash value (J3) of the still image data included in signature information of the cut out still image and determining whether they are the same, and comparing a connected hash value (J1#) of a hash value list (L1) included in the signature information of the original moving image with the connected hash value (J3) included in the signature information of the cut out still image and verifying a cut point.

6. The image managing method according to claim 1, wherein the still image is a JPEG image.

7. A non-transitory computer readable storage medium having stored therein an image managing program for causing a computer to execute a process comprising:

in the case of generating a signature of original moving image information dividing the original moving image into a header and a body and generating a group hash value (H1) of a header portion, generating a hash value (B#) of each piece of still image data, connecting the group hash value (H1) of the header portion and the hash value (B#) of each piece of still image data to generate each connected hash value (J1#), generating a group of connected hash values (J1#) as a hash value list (L1), generating a hash value (T) of a Huffman table on the basis of cutting out one still image, and signing to generate signature information of the original moving image, using the hash value (H1) of the group header portion, the hash value (T) of the Huffman table, and the hash value list (L1) as verification data for the original moving image, by adding a digital signature of a video recording terminal to it.

8. The non-transitory computer readable storage medium according to claim 7, the process further comprising:

in the case of generating cut out moving image information from a received original moving image and storing it specifying a still image of a portion cut out in the original moving image, generating a cut out moving image, and modifying the number of frames in such a way that header items can be reproduced, extracting a group hash value (H1) of a header portion included in the signature from signature information of the received original moving image, dividing the cut out moving image into a header and a body and generating an item group hash value (H2) of a header portion, generating a hash value (B#) of each piece of still image data of the cut out moving image, connecting the group hash value (H1) of the header portion extracted from signature information of the received original moving image and the hash value (B#) of each piece of still image data of the cut out moving image to generate a hash value (J2#) of each piece of still image data, specifying a group of the connected hash values (J2#) as a hash value list (L2), and signing to generate signature information of the cut out moving image, using the hash value (H2) of the header group and the hash value list (L2) as verification data for the cut out moving image, by adding a digital signature of an extractor to it.

9. The non-transitory computer readable storage medium according to claim 7, the process further comprising:
  in the case of generating cut out still image information from the received original moving image and storing it
  specifying a still image of a portion to be cut out, generating a cut out still image, and attaching a Huffman table to its proper place in such a way that it can be drawn,
  extracting a hash value (H1) of a header portion included in the signature from signature information of the received original moving image,
  generating a hash value (B3) of cut out still image data,
  connecting the hash value (H1) of the header portion extracted from the signature information of the original moving image and the hash value (B3) of the cut out still image data to generate a connected hash value (J3) of each piece of still image data, and
  signing to generate signature information of the cut out still image, using the connected hash value (J3) generated by the generating the connected hash value as verification data for the cut out still image, and adding a digital signature of an extractor to it.

10. The non-transitory computer readable storage medium according to claim 8, the process further comprising:
  in the case of verifying cut out moving image information
  receiving a cut out moving image, signature information of the cut out moving image, and signature information of the original moving image,
  dividing the cut out moving image into a header and a body, generating an item group hash value (H0) of a header portion, and comparing it with a hash value (H2) included in the signature information of the cut out moving image and determining whether they are the same,
  extracting a header group hash value (H1) included in the signature information of the original moving image,
  generating a hash value (B#) of each piece of still image data of the cut out moving image,
  connecting the header group hash value (H1) extracted from the signature information of the original moving image and each generated hash value (B#) to generate a connected hash value (J4#) of each piece of still image data,
  comparing the connected hash value (J2#) of a hash value list (L2) included in the signature information of the cut out moving image with the generated connected hash value (J4#) and determining whether they are the same, and
  comparing the connected hash value (J1#) in the hash value list (L1) included in the signature information of the original moving image with the connected hash value (J2#) of the hash value list (L2) included in the signature information of the cut out moving image and determining whether their cut points are the same.

11. The non-transitory computer readable storage medium according to claim 9, the process further comprising:
  in the case of verifying cut out still image information
  obtaining the cut out still image, signature information of the cut out still image, and signature information of the original moving image,
  generating a hash value (T0) of a Huffman table included in the cut out still image, comparing it with a hash value (T) of the Huffman table included in the signature information of the original moving image, and determining whether they are the same,
  extracting a group hash value (H1) of a header portion included in the signature information of the original moving image,
  generating a hash value (B3) of each piece of still image data of the cut out still image,
  connecting the header group hash value (H1) extracted from the signature information of the original moving image and the hash value (B3) of each piece of the generated still image data to generate a connected hash value (J3),
  comparing the connected hash value (J3) generated by the generating the connected hash value with the hash value (J3) of still image data included in signature information of the cut out still image and determining whether they are the same, and
  comparing a connected hash value (J1#) of a hash value list (L1) included in the signature information of the original moving image with the connected hash value (J3) included in the signature information of the cut out still image and verifying a cut point.

12. The non-transitory computer readable storage medium according to claim 7, wherein the still image is a JPEG image.

13. An image managing device for managing an original moving image and a still image included in the original moving image together as a pair, comprising:
  a memory storing software instructions; and
  a processor coupled to the memory and operable, in the case of generating a signature of original moving image information, to
    divide the original moving image into a header and a body and generate a group hash value (H1) of a header portion,
    generate a hash value (B#) of each piece of still image data,
    connect the group hash value (H1) of the header portion and the hash value (B#) of each piece of still image data to generate each connected hash value (J1#),
    generate a group of connected hash values (J1#) as a hash value list (L1),
    generate a hash value (T) of a Huffman table on the basis of cutting out one still image, and
    generate signature information of the original moving image, using the group hash value (H1) of the header portion, the hash value (T) of the Huffman table, and the hash value list (L1) as verification data for the original moving image, and adding a digital signature of a video recording terminal to it.

14. The image managing device according to claim 13, wherein in the case of generating cut out moving image information from a received original moving image and storing it, the processor is further operable to
  specify a still image of a portion to be cut out from the original moving image, to generate a cut out moving image and modify the number of frames in such a way that header items can be reproduced,
  extract a group hash values (H1) of a header portion included in the signature from signature information of the received original moving image,
  divide the cut out moving image into a header and a body and generate an item group hash value (H2) of a header portion,
  generate a hash value (B#) of each piece of still image data of the cut out moving image,
  connect the hash value (H1) of the group header portion extracted from signature information of the received original moving image and the hash value (B#) of each piece of still image data of the cut out moving image to generate a hash value (J2#) of each piece of still image data, specify a group of the connected hash values (J2#) as a hash value list (L2), and generate signature information of the cut out moving image, using the group hash value (H2) of the header portion and the hash value list (L2) as verification data for the cut out moving image, by adding a digital signature of an extractor to it.

15. The image managing device according to claim 13, wherein in the case of generating cut out still image information from the received original moving image and storing it, the processor is further operable to specify a still image of a portion to be cut out, generate a cut out still image, and attach a Huffman table to its proper place in such a way that it can be drawn, extract a hash value (H1) of a header portion included in the signature from signature information of the received original moving image, generate a hash value (B3) of cut out still image data, connect the hash value (H1) of the header portion extracted from the signature information of the original moving image and the hash value (B3) of the cut out still image data to generate a connected hash value (J3) of each piece of still image data, and generate signature information of the cut out still image, using the connected hash value (J3) generated by the generating the connected hash value as verification data for the cut out still image, by adding a digital signature of an extractor to it.

16. The image managing device according to claim 14, wherein in the case of verifying cut out moving image information, the processor is further operable to receive a cut out moving image, signature information of the cut out moving image, and signature information of the original moving image, divide the cut out moving image into a header and a body, generate an item group hash value (H0) of a header portion, compare it with a hash value (H2) included in the signature information of the cut out moving image, and determine whether they are the same, extract a header group hash value (H1) included in the signature information of the original moving image, generate a hash value (B#) of each piece of still image data of the cut out moving image, connect the header group hash value (H1) extracted from the signature information of the original moving image and each generated hash value (B#) to generate a connected hash value (J4#) of each piece of still image data, compare a connected hash value (J2#) of a hash value list (L2) included in the signature information of the cut out moving image with the generated connected hash value (J4#) and to determine whether they are the same, and compare a connected hash value (J1#) of the hash value list (L1) included in the signature information of the original moving image with the connected hash value (J2#) of the hash value list (L2) included in the signature information of the cut out moving image and to determine whether their cut out points are the same.

17. The image managing device according to claim 15, wherein in the case of verifying cut out still image information, the processor is further operable to obtain the cut out still image, signature information of the cut out still image, and signature information of the original moving image, generate a hash value (T0) of a Huffman table included in the cut out still image, compare it with a hash value (T) of the Huffman table included in the signature information of the original moving image, and to determine whether they are the same, extract a group hash value (H1) of a header portion included in the signature information of the original moving image, generate a hash value (B3) of each piece of still image data of the cut out still image, connect the header group hash value (H1) extracted from the signature information of the original moving image and the hash value (B3) of each piece of the generated still image data to generate a connected hash value (J3), compare the generated connected hash value (J3) with the hash value (J3) of still image data included in signature information of the cut out still image and determine whether they are the same, and compare a connected hash value (J1#) of a hash value list (L1) included in the signature information of the original moving image with a connected hash value (J3) included in the signature information of the cut out still image and verify a cut point.

18. The image managing device according to claim 13, wherein the still image is a JPEG image.

* * * * *